(12) United States Patent
Kim et al.

(10) Patent No.: US 11,233,280 B2
(45) Date of Patent: Jan. 25, 2022

(54) METHOD FOR CHARGING BATTERY INCLUDED IN ROBOT AND APPARATUS THEREOF

(71) Applicant: LG ELECTRONICS INC., Seoul (KR)

(72) Inventors: Sunok Kim, Seoul (KR); Jaemin Park, Seoul (KR); Youngjung Suh, Seoul (KR); Byounggyo Ahn, Seoul (KR); Youngkyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 16/555,234

(22) Filed: Aug. 29, 2019

(65) Prior Publication Data

US 2019/0386351 A1 Dec. 19, 2019

(30) Foreign Application Priority Data

Jun. 17, 2019 (KR) .................. 10-2019-0071810

(51) Int. Cl.
*H01M 10/44* (2006.01)
*H01M 10/42* (2006.01)
*H02J 7/00* (2006.01)

(52) U.S. Cl.
CPC ..... *H01M 10/4257* (2013.01); *H01M 10/443* (2013.01); *H02J 7/007* (2013.01); *H02J 7/00036* (2020.01); *H01M 2010/4271* (2013.01)

(58) Field of Classification Search
CPC ........... H01M 10/4257; H01M 10/443; H01M 2010/4271; H01M 10/46; H02J 7/00036; H02J 7/007; H02J 7/007182; H02J 7/007192; H02J 7/0069; Y02E 60/10; Y02T 90/12; Y02T 10/7072; Y02T 10/70; B60L 58/16; B60L 53/64; B60L 3/0046; B25J 19/005; G01R 31/392; G06N 3/08; G06N 20/00
See application file for complete search history.

(56) References Cited

U.S. PATENT DOCUMENTS

| | | | | |
|---|---|---|---|---|
| 9,720,478 | B2 * | 8/2017 | Hanafusa | H01M 10/48 |
| 2005/0001625 | A1 * | 1/2005 | Ashtiani | G01R 31/392 |
| | | | | 324/426 |
| 2015/0301118 | A1 * | 10/2015 | Tao | G01R 31/392 |
| | | | | 702/63 |
| 2016/0084918 | A1 * | 3/2016 | Hongo | G01R 31/392 |
| | | | | 702/63 |

* cited by examiner

*Primary Examiner* — Nghia M Doan
(74) *Attorney, Agent, or Firm* — Ked & Associates, LLP

(57) ABSTRACT

The present disclosure relates to charging a battery included in a robot. Standard deterioration cost information may be determined and stored based on an ambient temperature, a current rate, and a depth of discharge. This may include determining one standard deterioration cost information from among the stored standard deterioration cost information based on an ambient temperature of the robot and a current rate during an operation of the robot, and determining at least one depth of discharge at which the standard deterioration cost is equal to or less than a predetermined threshold based on the determined one standard deterioration cost information. The operation may be performed by repeating a process of charging and discharging the battery by a charge and discharge method based on the at least one depth of discharge.

18 Claims, 14 Drawing Sheets

METHOD FOR CHARGING BATTERY INCLUDED IN ROBOT AND APPARATUS THEREOF

CROSS-REFERENCE TO RELATED APPLICATION

This application is based on and claims priority under 35 U.S.C. § 119(a) to Korean Patent Application No. 10-2019-0071810, filed Jun. 17, 2019 in Korea, in the Korean Intellectual Property Office, the disclosure of which is incorporated herein in its entirety by reference.

BACKGROUND

1. Field

The present disclosure may relate to a robot capable of efficiently performing repeated battery charging and discharging processes in an environment in which the robot needs to perform the charging and discharging processes constantly for implementation of an operation.

2. Background

Various industrial robots for use in medical, aerospace, shipbuilding, and agricultural industries, for example, have been manufactured and operated. Common household robots have been developed, and robot control and manufacture technologies are evolving to enable implementation of predetermined operations using such household robots.

The household robots may include a robot cleaner and a lawn mower robot, for example, and may perform an operation in response to a user instruction or may start an operation periodically even if a user does not have an instruction to perform the operation. Since such a household robot may be devised to perform an operation in an automated manner or in a wireless manner, the household robot may include a rechargeable battery which may be referred to as a secondary battery. In an operating environment, it a charging and discharging process may need to be repeatedly performed. However, a reduction in lifespan of the battery or aging thereof may be inevitable.

In an example of a robot that is automatically operated, when it is determined that an operation has been completed or when a state of charge of a battery is reduced to a predetermined value or less, the robot may return to a charging station and immediately start a charging process. More particularly, when a workload is too high to complete all operations at once with power of a fully charged battery, a charging and discharging process may be repeatedly performed from the fully charged state to the fully discharged state. However, such a charging method may be detrimental to lifespan of a secondary battery and may cause a rapid reduction in lifespan of the battery.

Accordingly, when available power of a secondary battery included in a household or industrial robot falls below a certain level due to aging, a user may need to pay costs for increasing available time of the robot to replace the degraded battery with a new battery.

The price of the secondary battery may rapidly increase in proportion to capacity of the battery. Household robots may have required an increased capacity of a battery inserted therein in order to perform various operations, and therefore have been faced with an increase in replacement cost of the battery.

Meanwhile, when a certain condition is maintained according to an operating environment (for example, an ambient temperature of a robot that is operating and/or a magnitude of current at a time of charging or discharging), a degree of aging of the battery may be measured. However, since an amount of power (i.e., a state of charge (SoC)) in the battery continuously varies while the robot performs an operation and/or is in the process of charging, it may be difficult to estimate the degree of aging of the battery based on the amount of power in the battery.

BRIEF DESCRIPTION OF THE DRAWINGS

Embodiments may be described in detail with reference to the following drawings in which like reference numerals refer to like elements, and wherein.

DETAILED DESCRIPTION

Figure 1:
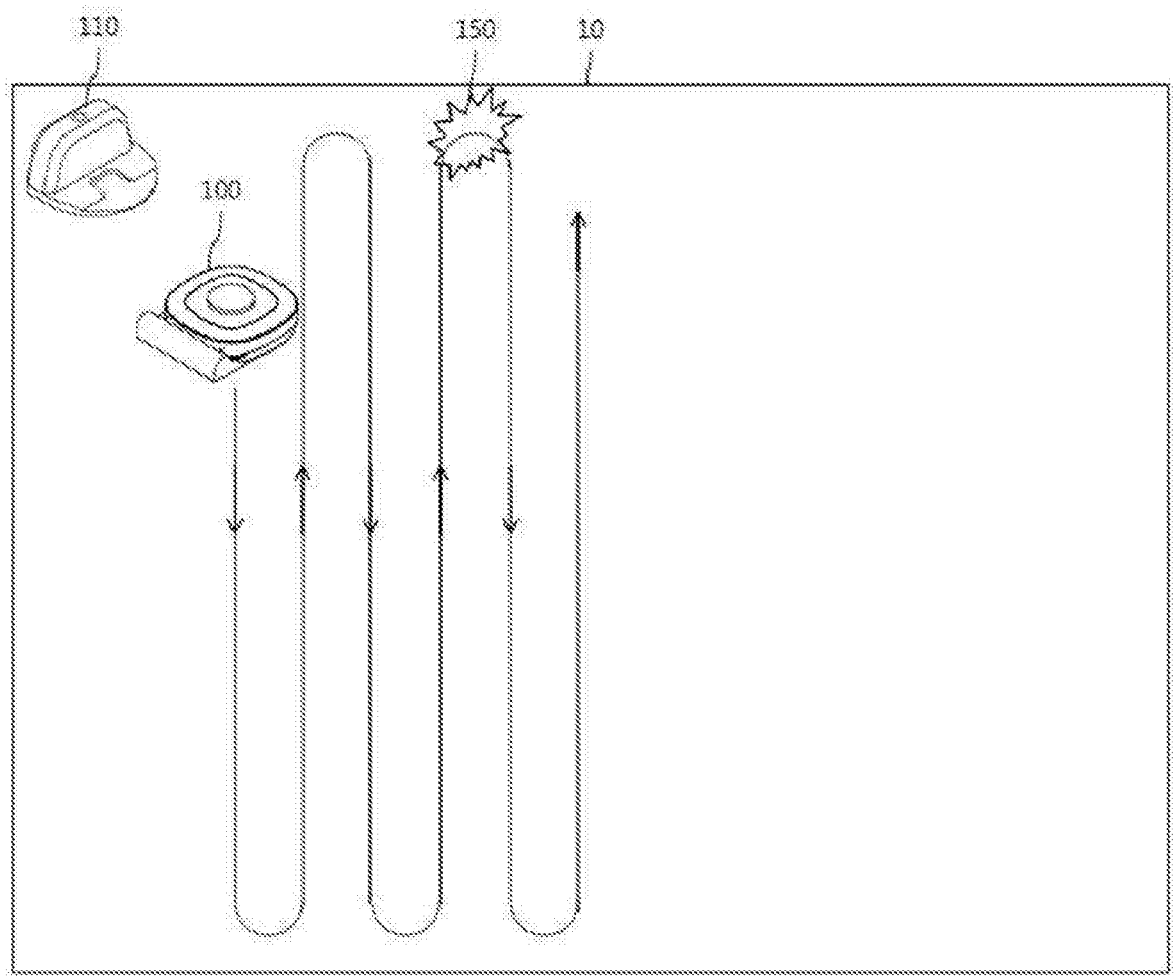
FIG. 1 illustrates an example in which a robot requires charging in an uncompleted state of an operation in an operating environment according to an embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Embodiments of the present disclosure may be described in detail with reference to the drawings so that those skilled in the art can easily carry out the present disclosure. The present disclosure may be embodied in many different forms and is not limited to the embodiments described herein.

With respect to constituent elements used in the following description, suffixes "module" and "unit" are given or mingled with each other only in consideration of ease in the preparation of the specification, and do not have or serve as different meanings.

In order to clearly describe the present disclosure, elements having no connection with the description are omitted, and the same or extremely similar elements are designated by the same reference numerals throughout the specification. In addition, some embodiments of the present disclosure will be described in detail with reference to exemplary drawings. When adding reference numerals to constituent elements of the respective drawings, it should be noted that the same or similar elements are denoted by the same reference numerals even though they are depicted in different drawings. In addition, in the following description of the present disclosure, a detailed description of known functions and configurations incorporated herein will be omitted when it may make the subject matter of the present disclosure rather unclear.

In addition, it will be understood that the terms first, second, A, B, (a), and (b), for example, may be used herein to describe various elements according to embodiments of the present disclosure. These terms are only used to distinguish one element from another element and, thus, are not intended to limit the essence, order, sequence, or number of elements. It will be understood that, when any element is referred to as being "connected to" "coupled to", or "joined to" another element, it may be directly on, connected to or coupled to the other element or intervening elements may be present.

It will be further understood that the terms "comprises" "comprising" "includes" and/or "including" when used in this specification, specify the presence of stated features, integers, steps, operations, elements, and/or components, but do not preclude the presence or addition of one or more other features, integers, steps, operations, elements, and/or components.

In addition, for convenience of description, the present disclosure may be embodied by subdividing constituent elements, but these constituent elements may be embodied in a single device or module, or one constituent element may be divided into multiple devices or modules.

Prior to describing various embodiments of the present disclosure, key terms may be described as follows. These descriptions are mere examples. Other descriptions may also be provided.

The term "robot" may refer to a machine that automatically operates or performs a given operation by abilities thereof. In particular, a robot that functions to recognize an environment and perform a motion based on self-determination may be referred to as an intelligent robot.

Robots may be classified into industrial, medical, household, and military robots, for example, according to purpose of use or field of use thereof.

The robot may include a drive unit (or driving device) including an actuator or a motor to perform various physical motions such as a motion of moving a robot joint arm. Additionally, a movable robot may include a wheel, a brake, and/or a propeller, for example, in the drive unit to travel on ground or fly in air via the drive unit.

The term "ambient temperature" may be temperature of an environment in which a robot is operating, and based on the ambient temperature, the rate of aging of a battery may be estimated. The following description may be made under the assumption that the ambient temperature of the robot corresponds to the temperature of the battery in consideration of the fact that the present disclosure is devised to determine the rate of aging of the battery, which is adaptive to the environment in which the robot is operating, although the rate of aging of the battery may be determined based on the temperature of the battery.

The term "current rate (C-rate)" may be the maximum value of current that enables safe discharge of a battery, and may also be referred to as charge and discharge current. For example, "1C" may be the amount of current capable of discharging power in the battery for one hour.

The "depth of discharge (DoD)" may be distinguished from the state of charge (SoC) of a battery, and may be expressed in unit of ampere-hour (Ah) or as a percentage value. For example, the depth of discharge may be 100% when the battery is discharged from the fully charged state to the fully discharged state, and may be 70% when the battery is discharged until the state of charge becomes 30%. That is, the depth of discharge may indicate how much the state of charge of the battery is reduced.

The term "charge and discharge start power" may be information including start-of-charge power and start-of-discharge power. The start-of-charge power is threshold power at which a robot may determine to stop an operation for charging, and may also be conceptually referred to as the end-of-discharge (EoD) power. The start-of-discharge (SoD) power may be threshold power at which a robot may determine to stop charge in order to start discharge (i.e., to start an operation) during charging. That is, the charge and discharge start power may be understood as information on start-of-charge power and start-of-discharge power which indicate power at which a robot may start charge or discharge.

The term "charge and discharge method" may be a method of repeatedly performing a charging and discharging process in order to complete an operation. According to an embodiment, when a robot has difficulty in completing an operation assigned thereto by only one charging process, multiple charging and discharging processes may be performed to complete the operation. The charge and discharge method may be a method of performing such multiple charging and discharging processes, and may be determined in advance. For example, the charge and discharge method may indicate that the robot starts a charging process or a discharging process with reference to the charge and discharge start power when the state of charge of a battery has reached a predetermined amount of power. According to an embodiment, the multiple charging and discharging processes, which may be performed to complete an operation, may refer to an example in which a cycle of performing a charging process, and then performing a discharging process during an operation is repeated at least once.

The term "aging information" may be a rate of the amount of chargeable power in a battery which is reduced compared to an initial amount of chargeable power in the battery per a predetermined workload (i.e. a predetermined amount of discharge power). The battery, which has been degraded due to repeated charging and discharging processes, may be charged with only a smaller amount of power than the initial amount of chargeable power. In this example, even if a user recognizes that the battery is fully charged, the amount of actually available power may be less than that in the initial state of the battery. For example, when the amount of discharge power is accumulated by 24 times the amount of power in the fully charged state of the battery and the amount of chargeable power in the battery is reduced to 86% of the initial amount of chargeable power, the aging information may be calculated as (100−86)/24, and therefore the battery may be defined as being degraded by about 0.058 during one cycle from the fully charged state to the fully discharged state. That is, the aging information may be information indicating a degree to which the battery is estimated to be quickly degraded when power is exhausted by the same cumulative amount of discharge power between various charge and discharge methods.

The term "standard deterioration cost" may be a value that is obtained by dividing a price of a battery by the amount of chargeable power in the battery, the depth of discharge, the number of charge and discharge cycles, and/or round-trip efficiency. That is, the standard deterioration cost may be understood as the cost of each watt, and the lower the standard deterioration cost, the more efficiently the power may be utilized. Therefore, when the standard deterioration cost is high even if the price of the battery is low, the battery can make economical power consumption relatively difficult despite the low price thereof.

The term "artificial Intelligence (A.I.)" may refer to the field of studying artificial intelligence or a methodology capable of making the artificial intelligence, and the term "machine learning" may refer to the field of studying methodologies that define and solve various problems handled in the field of artificial intelligence. The machine learning may also be defined as an algorithm that enhances performance of a task through a steady experience with respect to the task.

The term "artificial neural network (ANN)" may include an input layer and an output layer, and may selectively include one or more hidden layers. Each layer may include one or more neurons, and the artificial neural network may include a synapse that interconnects neurons. In the artificial neural network, each neuron may output signals input through the synapse, weights, and the value of an activation function concerning deflection.

The artificial intelligence is a model used in the machine learning, and may refer to a general model that is composed of artificial neurons (nodes) forming a network by synaptic connection and that has problem solving ability. The artificial neural network may be defined by a connection pattern between neurons of different layers, a learning process of updating model parameters, and an activation function of generating an output value.

The model parameters may refer to parameters determined by learning, and include weights for synaptic connection and deflection of neurons, for example. Hyperparameters may refer to parameters to be set before learning in a machine learning algorithm, and include a learning rate, the number of repetitions, the size of a mini-batch, and an initialization function, for example.

A purpose of learning of the artificial neural network may be to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning may refer to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks may also be called deep learning, and the deep learning is a part of the machine learning. The machine learning may be used as a meaning including the deep learning.

The term "autonomous driving (or self-driving)" may refer to a technology in which a vehicle drives autonomously, and the term "autonomous vehicle" may refer to a vehicle that travels without a user's operation or with a user's minimum operation.

For example, autonomous driving may include all of the technology of maintaining the lane in which a vehicle is driving, the technology of automatically adjusting a vehicle speed such as adaptive cruise control, the technology of causing a vehicle to automatically drive along a given route, and the technology of automatically setting a route, along which a vehicle drives, when a destination is set.

The vehicle may include all of a vehicle having only an internal combustion engine, a hybrid vehicle having both an internal combustion engine and an electric motor, and an electric vehicle having only an electric motor, and may include not only an automobile but also a train and a motorcycle, for example.

The autonomous vehicle may be seen as a robot having an autonomous driving function.

The term "extended reality" (XR) is a generic term for virtual reality (VR), augmented reality (AR), and mixed reality (MR). The VR technology provides only a CG image of a real-world object or background, for example, the AR technology provides a virtual CG image over an actual object image, and the MR technology is a computer graphic technology of providing an image obtained by mixing and combining virtual objects with the real world.

The MR technology may be similar to the AR technology in that it shows a real object and a virtual object together. However, the virtual object may be used to complement the real object in the AR technology, whereas the virtual object and the real object may be equally used in the MR technology.

The XR technology may be applied to a head-mounted display (HMD), a head-up display (HUD), a mobile phone, a tablet PC, a laptop computer, a desktop computer, a TV, and a digital signage, for example, and a device to which the XR technology is applied may be referred to as an XR device.

Various embodiments of the present disclosure may be described with reference to the drawings.

FIG. 1 illustrates an example in which a robot requires charging in an uncompleted state of an operation in an operating environment according to an embodiment. Other embodiments and configurations may also be provided.

A household or industrial robot may perform a predetermined operation in various environments. A robot 100 for use in various fields may be configured to receive power in a wireless manner, and thus may perform an operation while freely moving in an operating environment 10, but may need to be repeatedly charged. More particularly, when robot 100 may not have completed an operation with only a single charging process because of a high workload required in operating environment 10, robot 100 may temporarily stop the operation at a position 150 determined as the position at which power is insufficient and may move to a robot fixing unit 110, which is capable of supplying power, for charging to receive power. After a charging process terminates, the robot may restart the operation. The robot fixing unit 110 (or robot fixing device) may be included in the operating environment in which the robot operates, or may be located adjacent to the operating environment. When it is determined that the state of charge is low and the supply of power is required, robot 100 may easily and automatically move to robot fixing unit 110 to receive power from a power supply unit (or power supply) included in robot fixing unit 110, or may be manually powered off by a user to receive power from robot fixing unit 110.

In operating environment 10 in which several times of charging and discharging processes are required to perform an operation once, a charge and discharge method of charging a battery until the battery is fully charged after performing an operation until the battery is substantially fully discharged, and then restarting the operation has been used. This method may reduce the number of charging and discharging times, but may result in rapid aging of the battery. Embodiments of the present disclosure may prevent aging of the battery by a method of charging and discharging the battery of robot 100 in operating environment 10.

Figure 2:
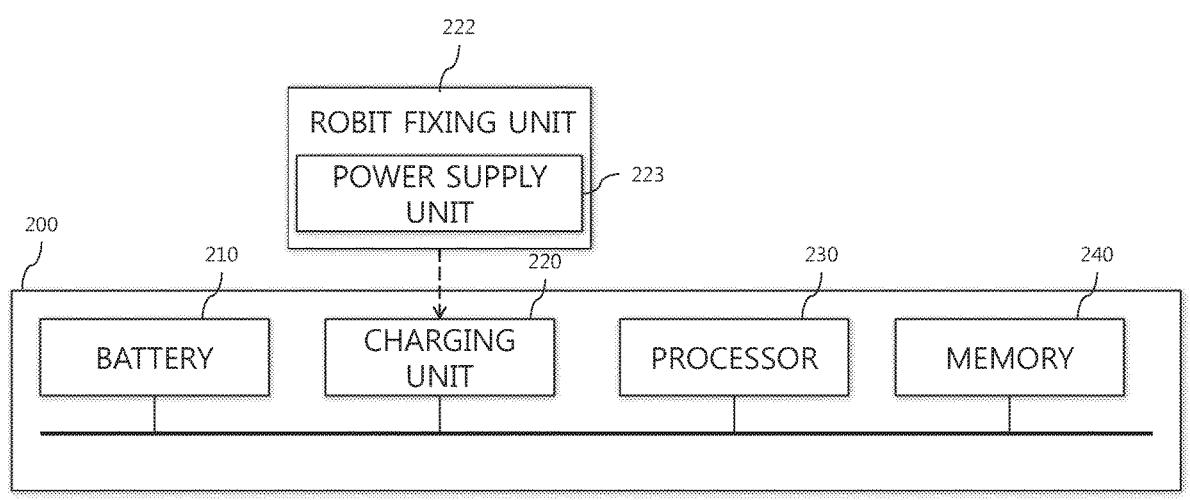
FIG. 2 is a block diagram illustrating a correlation between a robot, which is capable of repeatedly performing a battery charging and discharging process for implementation of an operation, and a robot fixing unit according to an embodiment.

FIG. 2 is a block diagram illustrating a correlation between a robot, which is capable of repeatedly performing a battery charging and discharging process for implementation of an operation, and a robot fixing unit according to an embodiment. Other embodiments and configurations may also be provided.

According to an embodiment, a robot 200 and a robot fixing unit 222 (or robot fixing device) of FIG. 2 may correspond to robot 100 and robot fixing unit 110 of FIG. 1. According to an embodiment, multiple robot fixing units 222 may be included in operating environment 10. According to an embodiment, the robot 200 may return to robot fixing unit 222 for charging a battery 210. The robot fixing unit 222 may be also referred to as a charging station.

Referring to FIG. 2, according to an embodiment, robot 200 may include a battery 210 capable of supplying power required for various constituent elements included in robot 200, a charging unit 220 (such as a charger or a charger device) capable of charging the battery by supplying power supplied from a power supply unit 223 (or power supply) to battery 210, a processor 230 capable of controlling operations of the constituent elements included in robot 200, and a memory 240 capable of storing standard deterioration cost information.

According to an embodiment, battery 210 may be a secondary battery that is rechargeable after discharge. Battery 210 may include any one of various types of rechargeable secondary batteries including a lithium ion battery, a nickel hydride battery, and a nickel cadmium battery, for example.

According to an embodiment, charging unit 220 (or charging device) may charge battery 210 upon receiving power from power supply unit 223. According to an embodiment, a connection relationship between power supply unit 223 and robot 200 for supplying the power from power supply unit 223 to battery 210 via charging unit 220 may be realized in a wired manner using a power line, and/or may also be realized in a wireless charging manner.

According to an embodiment, processor 230 may control constituent elements included in robot 200 to realize various embodiments which may be implemented by various constituent elements included in robot 200. That is, in various embodiments which may be described below, an operation of robot 200 may be understood as being based on a control operation by the processor 230. According to an embodiment, processor 230 may include at least one of a RAM, a ROM, a CPU, a graphic processing unit (GPU), and a bus, which may be interconnected.

Processor 230 may access memory 240 included in robot 200 and perform booting using an O/S stored in memory 240. The processor may perform various operations using various programs, content, data, and predetermined information, for example, which are stored in memory 240.

According to an embodiment, processor 230 may notify a user of the result of robot 200 performing a predetermined process by controlling an output device to visually, acoustically, and/or tactually output the result of performing each step of a method performed by robot 200 according to the present disclosure.

Various operations which may be performed by robot 200 of FIG. 2 may be understood by those skilled in the art from the following various embodiments.

Figure 3:
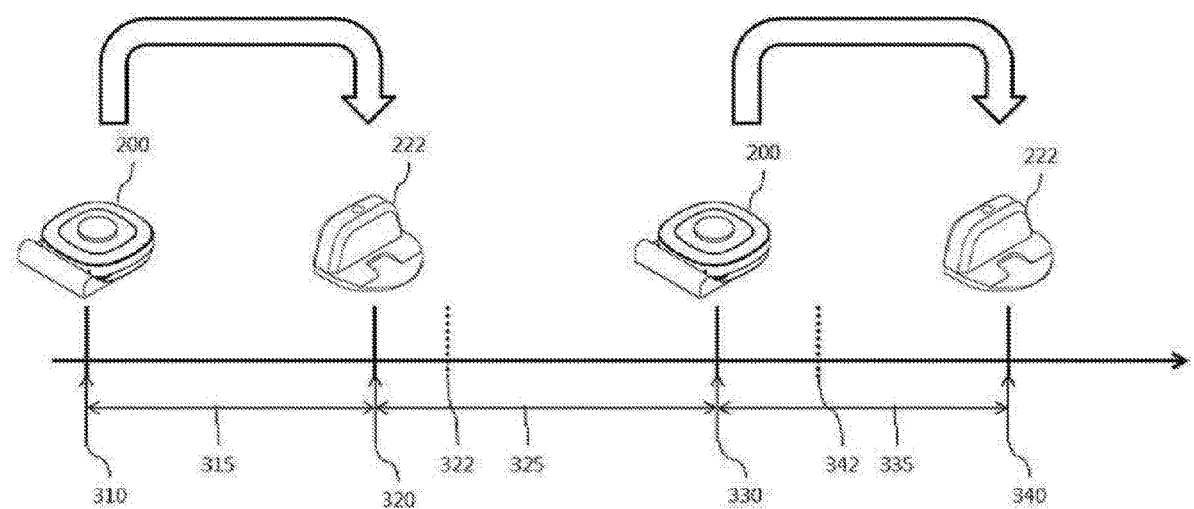
FIG. 3 illustrates charging a battery in a time sequence according to an embodiment.

FIG. 3 illustrates a process of charging a battery in a time sequence according to an embodiment. Other embodiments and configurations may also be provided. FIG. 3 shows a time point at which robot 200 returns to robot fixing unit 222 for charging battery 210 after performing an operation, a time point at which the robot starts to charge the battery for supplementing power exhausted by the operation, and a time point at which the operation is restarted after charging is completed by a charging method.

According to an embodiment, since battery 210 is discharged from a time point 310 at which robot 200 starts to operate (i.e., starts to discharge) to a time point 320 at which the robot starts to charge, the period between the two time points may be referred to as a discharge time 315. According to an embodiment, robot 200 which is charging may determine whether the state of charge of battery 210 is equal to start-of-discharge power in order to determine whether or not time point 310 at which robot 200 starts to discharge has come. That is, when it is determined that the state of charge of battery 210 is equal to or greater than the start-of-discharge power, robot 200 may restart the operation by starting a discharging process after stopping the charging process. According to an embodiment, robot 200 may start to charge by determining whether or not the state of charge of battery 210 decreases to start-of-charge power or less during the discharging process.

In disadvantageous arrangements, the state of charge of battery 210 at a start-of-charge time point may be substantially the fully discharged state. In this example, since a start-of-charge time point 322 may be later than start-of-charge time point 320 according to the present disclosure, an operation implementation time may be extended. However, even if the number of charging and discharging times is reduced, the overall time taken to complete an operation may not be reduced, and aging of battery 210 may be adversely affected. According to the present disclosure, a time point at which the state of charge of battery 210 becomes equal to or less than a predetermined value may be determined as start-of-charge time point 320 so that battery 210 is not fully discharged in consideration of the above-described negative effects of disadvantageous arrangements.

According to an embodiment, robot 200, which performs a charging process from time point 320 at which the state of charge has reached the start-of-charge power, may restart the operation at a time point 330 at which it is determined that the state of charge of battery 210 becomes equal to or greater than the start-of-discharge power.

According to disadvantageous arrangements, the state of charge of battery 210 may be substantially the fully discharged state at a time point 342 at which the state of charge has reached the start-of-discharge power, and in this example, since time point 342 at which the state of charge has reached the start-of-discharge power may be later than time point 330 at which the state of charge has reached the start-of-discharge power according to the present disclosure, the robot may restart the operation using battery 210 containing a larger amount of power. However, implementation of an operation based on the fully charged state as described above may take a longer time until the operation is completed, and may have an adverse effect on the aging of battery 210. According to the present disclosure, a time point at which the state of charge of battery 210 becomes equal to or greater than a predetermined value may be determined as start of-discharge time point 330 so that battery 210 is not fully charged or overcharged in consideration of the above-described negative effects of disadvantageous arrangements.

According to an embodiment, robot 200 may be connected to robot fixing unit 222 to receive power from power supply unit 223, and a charge time 325 may be a time from time point 320 at which the state of charge has reached the start-of-charge power to time point 330 at which the state of charge has reached the start-of-discharge power. Robot 200 may perform the operation for a next discharge time 335 after time point 330 at which the state of charge has reached the start-of-discharge power, and thereafter may return to robot fixing unit 222 and start to charge at a time point 340 at which the state of charge has again reached the start-of-charge power.

Figure 4:
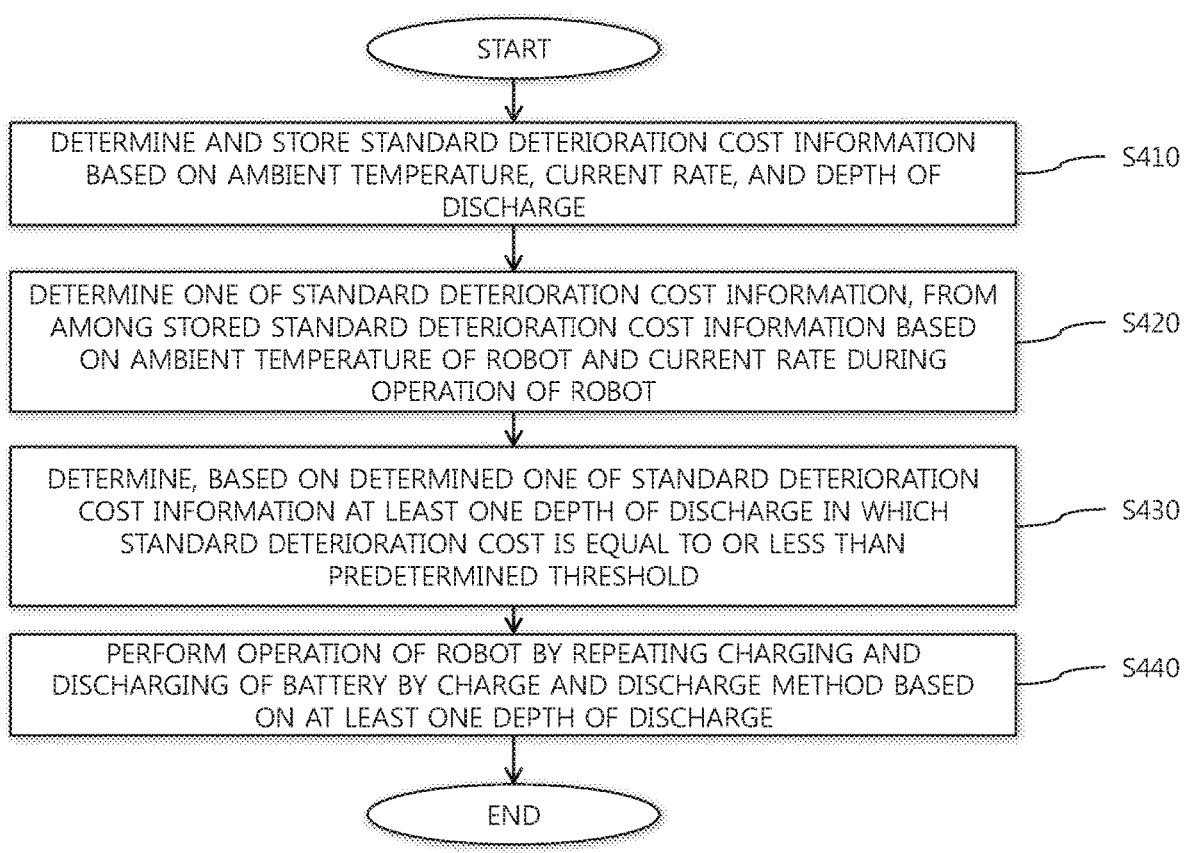
FIG. 4 is a flowchart illustrating charging and discharging a battery of a robot according to an embodiment.

FIG. 4 is a flowchart illustrating charging and discharging battery of robot according to an embodiment. Other embodiments and configurations may also be provided.

In step S410, robot 200 may determine (or predetermine) and store standard deterioration cost information based on the ambient temperature, the current rate, and the depth of discharge according to an embodiment. According to an embodiment, the standard deterioration cost information may indicate multiple values of standard deterioration cost determined according to the ambient temperature, the current rate, and the depth of depth. That is, the standard deterioration cost of battery 210 may vary due to various factors including the ambient temperature, the current rate, and the depth of discharge, for example. Thus, robot 200 may determine the standard deterioration cost information based on the ambient temperature, the current rate, and the depth of discharge, and may control battery 210 to be charged and discharged with a lowest standard deterioration cost depending on an operating environment.

According to an embodiment, the lower the ambient temperature, the lower the terminal voltage due to increased internal resistance in battery 210 during a discharging process, which causes a reduction in the amount of dischargeable power. On the other hand, the higher the ambient temperature, the weaker the intermolecular bonding force due to increased electrolyte internal pressure in battery 210 during a discharging process, which may facilitate electrolyte decomposition and accelerate aging of battery 210. Accordingly, the ambient temperature may affect the deterioration and aging of the battery, and robot 200 may minimize the deterioration of battery 210 by determining a temperature section in which deterioration of the battery is minimized and determining an optimal charge and discharge method based on the determined temperature section.

According to an embodiment, as the current rate decreases at a constant ambient temperature, the state of charge of battery 210 in the fully charged state may increase.

According to an embodiment, robot 200 may determine the ambient temperature and the current rate according to an operating environment, and may determine the rate of aging of battery 210 in the state in which the aforementioned conditions are maintained constantly. However, since robot 200 performs an operation while continuously repeating a charging and discharging process, the value of the state of charge of battery 210 may continuously vary. Therefore, it may not be appropriate to use the SoC value as a criterion for estimating the rate of aging. Therefore, robot 200 of the present disclosure may estimate the rate of aging of battery 210 based on the depth of discharge which is maintained constantly, rather than the SoC value which may continuously vary due to the charging and discharging process.

According to an embodiment, robot 200 may consider the ambient temperature, the current rate, and the depth of discharge in order to estimate the rate of aging in an operating environment in which a charging and discharging process is performed multiple times at a constant interval to complete a predetermined operation.

According to an embodiment, robot 200 may store the determined standard deterioration cost (or predetermined standard deterioration cost) based on the ambient temperature, the current rate, and the depth of discharge. According to an embodiment, robot 200, which stores the determined standard deterioration cost information, may determine the depth of discharge at which the standard deterioration cost is minimized during a charging or discharging process in a current operating environment such as the ambient temperature and the current rate. Accordingly, robot 200 may determine the depth of discharge which minimizes the standard deterioration cost adaptively to an operating environment.

However, it may be inefficient or extremely difficult for robot 200 to store the standard deterioration cost information in various operating environments considering a large number of examples. According to an embodiment, robot 200 may further perform a process of calculating and utilizing additional information other than the stored standard deterioration cost information. This may be described below in detail.

In step S420, robot 200 may determine one standard deterioration cost information from among the stored standard deterioration cost information based on the ambient temperature of the robot and the current rate during an operation of the robot. The standard deterioration cost information, stored in step S410, may be determined in consideration of various operating environments that robot 200 encounters, such as the ambient temperature and the current rate. Thus, the robot may determine one standard deterioration cost information from among the stored standard deterioration cost information using information on the ambient temperature of robot 200 in an operating environment and information on the current rate which may be obtained during an operation of robot 200. The robot may determine the depth of discharge, which may be used in the charge and discharge method, based on the determined one standard deterioration cost information.

In step S430, robot 200 may determine at least one depth of discharge at which the standard deterioration cost is equal to or less than a predetermined threshold. According to an embodiment, robot 200 may determine, as the at least one depth of discharge, a predetermined number of depths of discharge in an ascending order of the standard deterioration cost. According to an embodiment, robot 200 may determine, as the at least one depth of discharge, the depth of discharge at which the standard deterioration cost is equal to or less than a predetermined value. According to an embodiment, robot 200 may determine the depth of discharge which minimizes the standard deterioration cost. Accordingly, robot 200 may delay the aging of battery 210 by determining the depth of discharge having low standard deterioration cost in an operating environment.

In step S440, robot 200 may perform an operation while repeating a battery charging and discharging process with a charge and discharge method based on at least one depth of discharge according to an embodiment. According to an embodiment, robot 200 may perform a charging and discharging process using one depth of discharge which satisfies a predetermined criterion from among one or more depths of discharge, and may perform an operation based on implementation of a charging and discharging process. A process of determining at least one depth of discharge by robot 200 may be described below.

Figure 5:
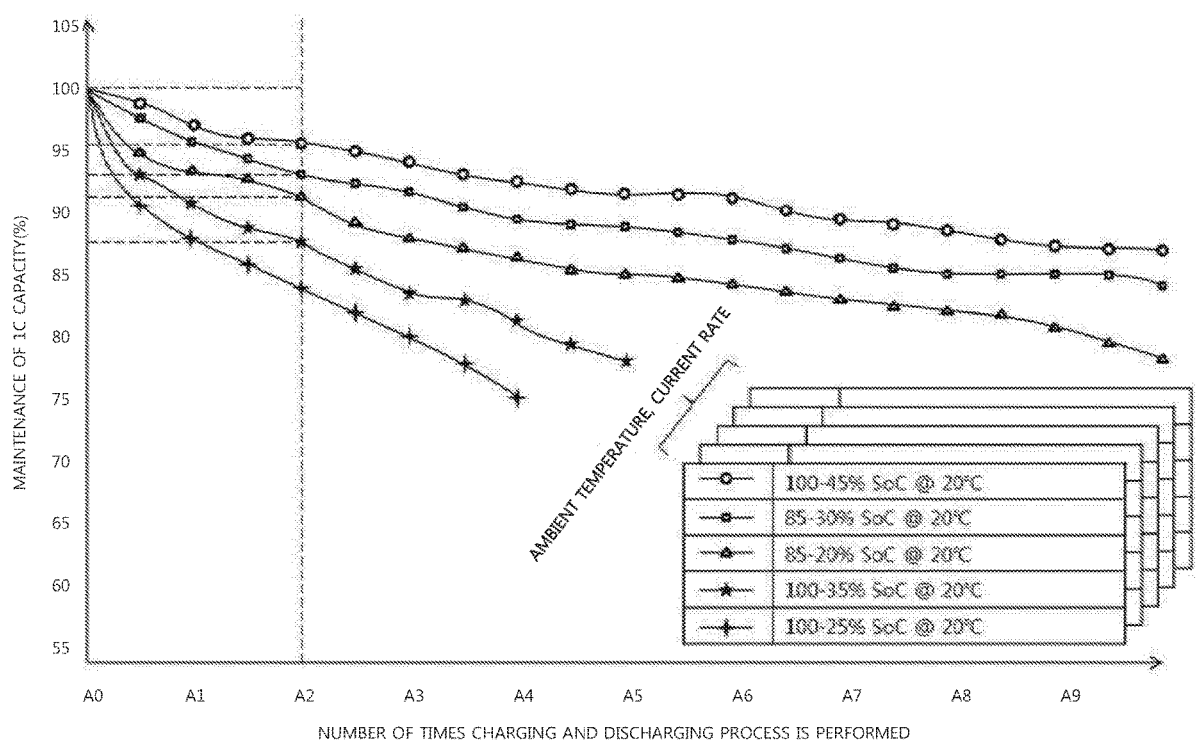
FIG. 5 is a graph illustrating a degree of aging of a battery, which is repeatedly charged and discharged, based on a predetermined depth of discharge, start-of-charge power, and start-of-discharge power according to an embodiment.

FIG. 5 is a graph illustrating a degree of aging of battery, which is repeatedly charged and discharged, based on a predetermined depth of discharge, start-of-charge power, and start-of-discharge power according to an embodiment. Other embodiments and configurations may also be provided.

According to an embodiment, aging of battery 210, by which the amount of chargeable power decreases, is ongoing due to repeated charging and discharging processes. When only the amount of power equal to or less than a predetermined percentage (for example, 80%) of the amount of initial chargeable power is chargeable, the lifespan of battery 210 may be considered to have ended.

According to an embodiment, robot 200 may perform charging and discharging processes at different depths of discharge depending on an operating environment. FIG. 5 shows the degree of aging of battery 210 when a charging and discharging process is repeated according to five charge and discharge methods, which may be performed by robot 200. Referring to FIG. 5, the amount of chargeable power decreases due to the aging of battery 210 when a charging and discharging process is performed using the charge and discharge methods based on the depths of discharge of 55%, 65%, and 75%, and the rate of aging of battery 210 is the lowest at the depth of discharge of 55% and is the highest at the depth of discharge of 75%. That is, assuming that the number of times the charging and discharging process is performed is A2, the amount of chargeable power of battery 210 becomes much smaller than the amount of initial chargeable power when the charge and discharge method uses a larger depth of discharge, and thus the larger the depth of discharge, the higher the rate of aging of battery 210.

According to an embodiment, the rate of aging of battery 210 may vary even when the depth of discharge is constant. Referring to FIG. 5, even if the depth of discharge is 55%, when comparing the rate of aging between the example in which the start-of-charge power is 45% and the start-of-discharge power is 100% (hereinafter referred to as a first charge and discharge method) and the example in which the start-of-charge power is 30% and the start-of-discharge power is 85% (hereinafter referred to as a second charge and discharge method), the rate of aging based on the second charge and discharge method is higher. Moreover, referring again to FIG. 5, even if the depth of discharge is 65%, when comparing the rate of aging between the example in which the start-of-charge power is 20% and the start-of-discharge power is 85% (hereinafter referred to as a third charge and discharge method) and the example in which the start-of-charge power is 35% and the start-of-discharge power is 100% (hereinafter referred to as a fourth charge and discharge method), the rate of aging based on the fourth charge and discharge method is higher. That is, even if the depth of discharge is the same, the rate of aging may vary according to the values of the start-of-charge power and the start-of-discharge power.

According to an embodiment, robot 200 may determine a charge and discharge method having a low rate of aging in consideration of not only the depth of discharge but also the start-of-charge power and the start-of-discharge power associated with the depth of discharge. When the depth of discharge is the same and the charge and discharge start power (including the start-of-charge power and the start-of-discharge power) varies, there may be a difference in the rate of aging as shown in the following table.

TABLE 1

| Depth of Discharge | Start-of-Charge power | Start-of-Discharge power | Number of Charge and Discharge Cycles | Amount of Chargeable Power (%) | Degree of Aging (%) | Degree of Aging upon 1K Charging and Discharging |
|---|---|---|---|---|---|---|
| 65 | 100 | 35 | 2500 | 82 | 18 | 7.2 |
| 65 | 85 | 20 | 2500 | 88 | 12 | 4.8 |

According to an embodiment, referring to FIG. 5, aging information, which may be calculated (or determined) based on the charge and discharge start power for each depth of discharge, may be determined based on a predetermined ambient temperature or a predetermined current rate, robot 200 may determine aging information of battery 210 based on the depth of discharge and the charge and discharge start power for each of various ambient temperatures or each of various current rates in order to take into account an operating environment such as the various ambient temperatures and current rates.

Figure 6:
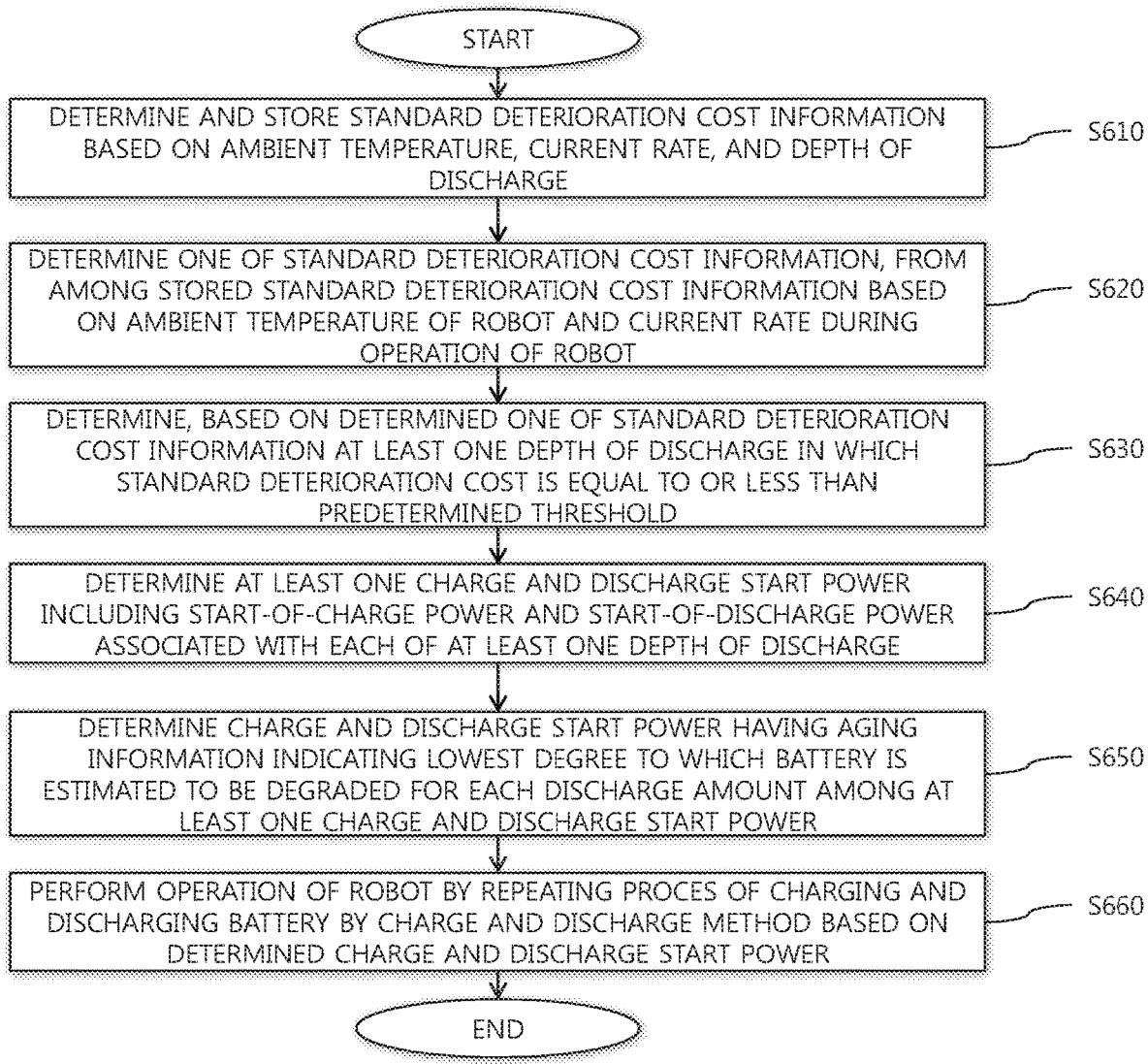
FIG. 6 is a flowchart illustrating a method of charging and discharging a battery by selecting start-of-discharge power and start-of-charge power, which have a lowest value of the degree of aging, among start-of-discharge power and start-of-charge power associated with at least one depth of discharge according to an embodiment.

FIG. 6 is a flowchart illustrating a method of charging and discharging battery by selecting start-of-discharge power and start-of-charge power having aging information indicating a lowest degree of aging from among start-of-discharge power and start-of-charge power associated with at least one depth of discharge according to an embodiment. Other embodiments and configurations may also be provided.

The features of steps S610 to S630 may be the same as or similar to those of steps S410 to S430 of FIG. 4, and thus, a detailed description thereof may be omitted.

In step S640, according to an embodiment, robot 200 may determine at least one charge and discharge start power including start-of-discharge power and start-of-charge power. According to an embodiment, robot 200 may determine at least one charge and discharge start power including start-of-discharge power and start-of-charge power associated with each of at least one depth of discharge. Accordingly, robot 200 may determine aging information of battery 210 based on the start-of-charge power and the start-of-discharge power even if the depth of discharge is the same.

In step S650, robot 200 may determine the charge and discharge start power having the lowest rate of aging of battery 210 among at least one charge and discharge start power according to an embodiment. According to an embodiment, robot 200 may determine at least one charge and discharge start power corresponding to each of at least one depth of discharge. Accordingly, since the start-of-charge power and the start-of-discharge power vary even if the depth of discharge is the same, robot 200 may determine a degree to which battery 210 is estimated to be degraded. That is, when one depth of discharge is determined in step S630, robot 200 may determine the charge and discharge start power having the lowest degree of aging based on at least one charge and discharge start power associated with the corresponding depth of discharge. Furthermore, when multiple depths of discharge are determined in step S630, the robot may determine the charge and discharge start power having the lowest degree of aging based on at least one charge and discharge start power associated with each of the multiple depths of discharge.

According to an embodiment, robot 200 may determine the charge and discharge start power having the lowest degree of aging among the charge and discharge start power associated with multiple depths of discharge, and/or may determine the charge and discharge start power having the shortest operation completion time among the charge and discharge start power within a predetermined range from the lowest rate of aging. Accordingly, robot 200 may reduce replacement cost of the degraded battery by selecting the charge and discharge method having the lowest rate of aging, and may also reduce inconvenience of a user who actually uses robot 200 to substantially perform an operation by determining the charge and discharge method which slows down the rate of aging within a predetermined range and minimizes the time taken until an operation is completed.

In step S660, robot 200 may perform an operation by repeating a battery charging and discharging process using the charge and discharge method based on the charge and discharge start power determined in step S650 according to an embodiment. Robot 200 may repeat the charging and discharging process until the operation is completed using the charge and discharge start power determined in step S650. According to an embodiment, when it is determined that the current operation is completed, robot 200 may terminate the discharging process and may return to robot fixing unit 222.

According to an embodiment, robot 200 may determine and store the standard deterioration cost in order to determine the depth of discharge having the lowest standard degradation cost in various operating environments. Thus, robot 200 may determine an appropriate depth of discharge in the example in which a large number of pieces of the standard deterioration cost information for various operating environments are predetermined (or determined) and stored, but it may be actually difficult and inefficient to store the standard deterioration cost information for all operating environments. Therefore, robot 200 may compensate for the standard deterioration cost information, which is not stored, between the stored standard deterioration cost information, using a predetermined method.

According to an embodiment, in order to determine and store the standard deterioration cost, when at least one of the ambient temperature, the current rate, and the depth of discharge does not correspond to the determined standard deterioration cost information, non-predetermined (or non-determined) standard deterioration cost information may be determined and stored via interpolation or extrapolation based on the determined standard deterioration cost information. Such interpolation or extrapolation may be used as one of various methods used in the field of numerical analysis.

According to an embodiment, extrapolation is a method of estimating information based on expansion of previously determined values or certain information. That is, the extrapolation may be a method of deducing something which is not explicitly mentioned in existing information. According to an embodiment, various extrapolation methods, which may be available to those of ordinary skill in the art, such as the Richardson extrapolation, may be used. The interpolation is a method of estimating a value between two pieces of known information among a series of information. According to an embodiment, various interpolation methods such as linear interpolation, polynomial interpolation, and spline interpolation may be used. Thus, when there is a gap between pieces of information, but data in either direction of the gap or at a specific point in the gap may be used, the interpolation may be used to estimate information in the gap.

Accordingly, robot 200 may determine the depth of discharge having the lowest standard deterioration cost in various operating environments by complementing non-predetermined standard deterioration cost information, using the stored and determined standard deterioration cost information.

Figure 7:
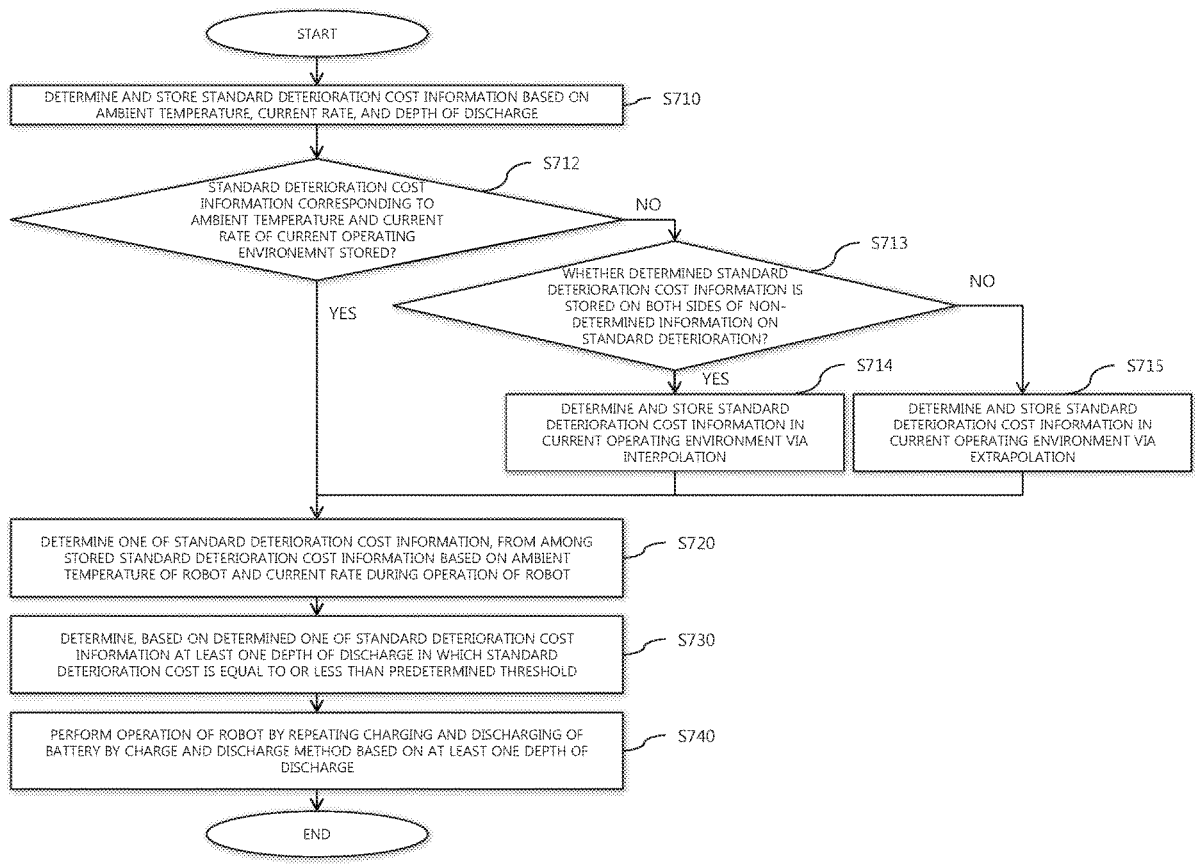
FIG. 7 illustrates an extrapolation or interpolation process by a robot for determining non-predetermined standard deterioration cost information according to an embodiment.

FIG. 7 illustrates an extrapolation or interpolation process by robot for determining standard deterioration cost information which has not been predetermined (or determined) according to an embodiment. Other embodiments and configurations may also be provided.

The features of steps S710 to S740 of FIG. 7 may be the same as or similar to those of steps S410 to S440 of FIG. 4, and thus, a detailed description thereof may be omitted.

In step S712, robot 200 may determine whether or not standard deterioration cost information corresponding to an ambient temperature and a current rate of a current operating environment is stored. According to an embodiment, since robot 200 may not store standard deterioration cost information of all actual operating environments, there may be non-predetermined information between the determined (or predetermined) standard deterioration cost information.

In step S713, robot 200 may determine whether or not the predetermined standard deterioration cost information is stored on both sides of non-predetermined standard deterioration cost information. According to an embodiment, both sides of the non-predetermined standard deterioration cost information may be understood as an increasing direction or a decreasing direction of the ambient temperature, the current rate, and/or the depth of discharge, which are factors by which standard deterioration cost information is determined.

According to an embodiment, when it is determined that the predetermined standard deterioration cost information (or determined standard deterioration cost information) is stored on both sides of non-predetermined standard deterioration cost information, robot 200 may determine and store standard deterioration cost information of the current operating environment via interpolation in step S714.

According to an embodiment, when it is determined that the predetermined standard deterioration cost information is not stored on both sides of non-predetermined standard deterioration cost information, robot 200 may determine and store standard deterioration cost information of the current operating environment via extrapolation in step S715.

According to an embodiment, robot 200 may determine and store non-predetermined standard deterioration cost information by interpolation or interpolation, and may use the information in a process after step S720.

Figure 8:
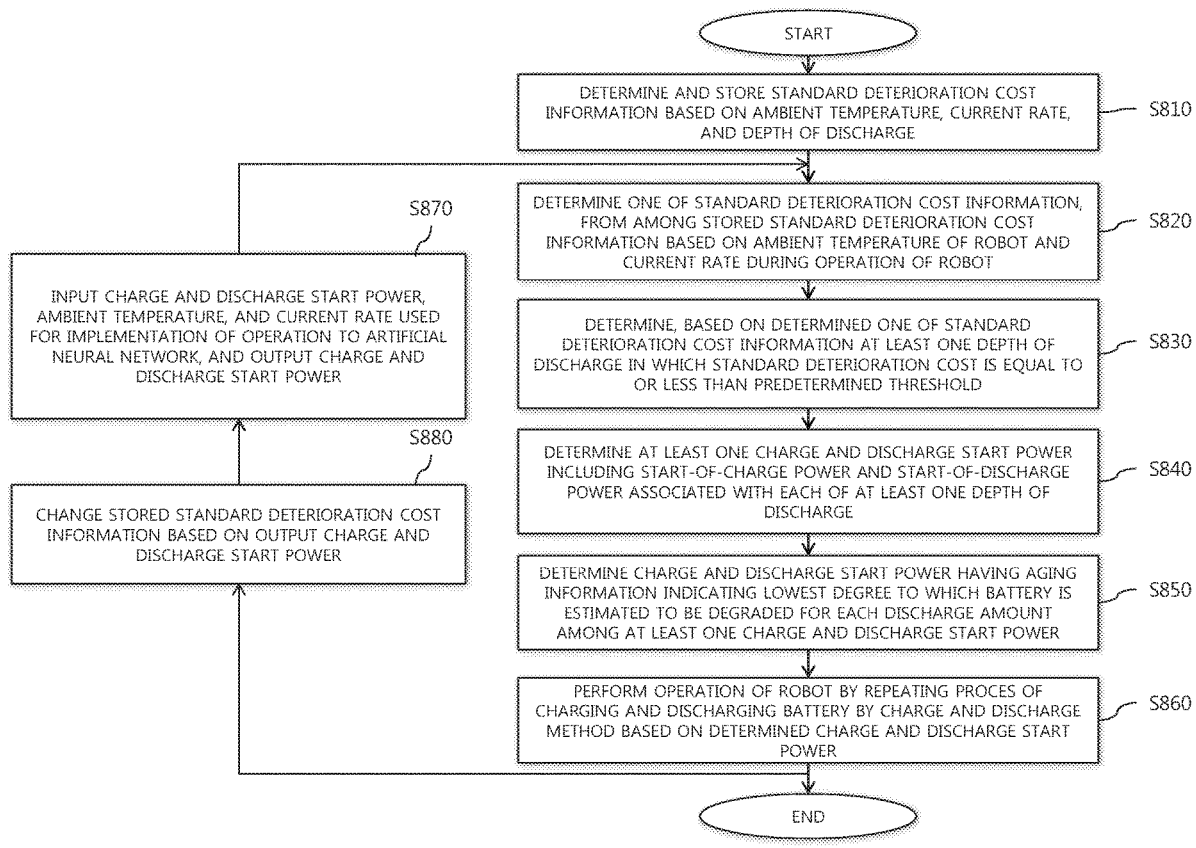
FIG. 8 is a flowchart for explaining determining a depth of discharge that minimizes standard deterioration cost in an operating environment using an artificial neural network according to an embodiment.

FIG. 8 is a flowchart for explaining a process of determining a depth of discharge that minimizes standard deterioration cost in an operating environment using an artificial neural network according to an embodiment. Other embodiments and configurations may also be provided.

According to an embodiment, robot 200 may perform a predetermined information output process using an artificial neural network. According to an embodiment, a function of the artificial neural network may be implemented by driving software by processor 230, and/or may be implemented via a separate component (for example, an neural processing unit (NPU)) which is distinguished from processor 230.

The features of steps S810 to S860 may be the same as or similar to those of steps S610 to S660 of FIG. 6, and thus a detailed description thereof may be omitted.

In step S870, robot 200 may input the ambient temperature, the current rate, and the charge and discharge start power used for implementation of an operation to the artificial neural network as input information of the artificial neural network. According to an embodiment, the information on the ambient temperature and the current rate, which is input to the artificial neural network, may be understood as information for deriving standard deterioration cost suitable for a current operating environment of robot 200. According to an embodiment, charge and discharge start power may be output from the artificial neural network based on the input information.

In step S880, robot 200 may correct (or change) the stored standard deterioration cost information based on the charge and discharge start power output in step S870 according to an embodiment. Since the charge and discharge start power output according to an embodiment enables a charging and discharging process based on lower standard deterioration cost than by the input charge and discharge start power, aging of battery 210 may be reduced compared to that by the input charge and discharge start power. Thus, robot 200 may correct the standard deterioration cost information based on the output information from the artificial neural network, and may use the information in a next charging and discharging process.

According to an embodiment, the standard deterioration cost information, corrected (or changed) based on the output information from the artificial neural network, may be referred to when an operation is started again after the operation of robot 200 is completed.

According to an embodiment, the corrected standard deterioration cost information (or changed standard deterioration cost information) based on the output information from the artificial neural network may be referred to in a charging and discharging process performed while robot 200 is performing the operation. Robot 200 may determine whether or not there is a difference between the charge and discharge start power output in step S870 and the input charge and discharge start power, and when it is determined that there is a difference, robot may correct (or change) the standard deterioration cost information based on the output information, and then may refer to the information in a charging and discharging process performed during a current operation.

According to an embodiment, robot 200 may perform the input and output of information to and from the artificial neural network and may correct (or change) the stored standard deterioration cost information based on the result of extrapolation or interpolation of stored the standard deterioration cost information.

According to an embodiment, for machine learning of the artificial neural network of robot 200, a model which performs on-line machine learning and/or a model which performs off-line machine learning using information collected on off-line may be used. Details of the features of robot 200 using the artificial neural network may be described below in detail with reference to FIGS. 11 to 13.

Figure 9:
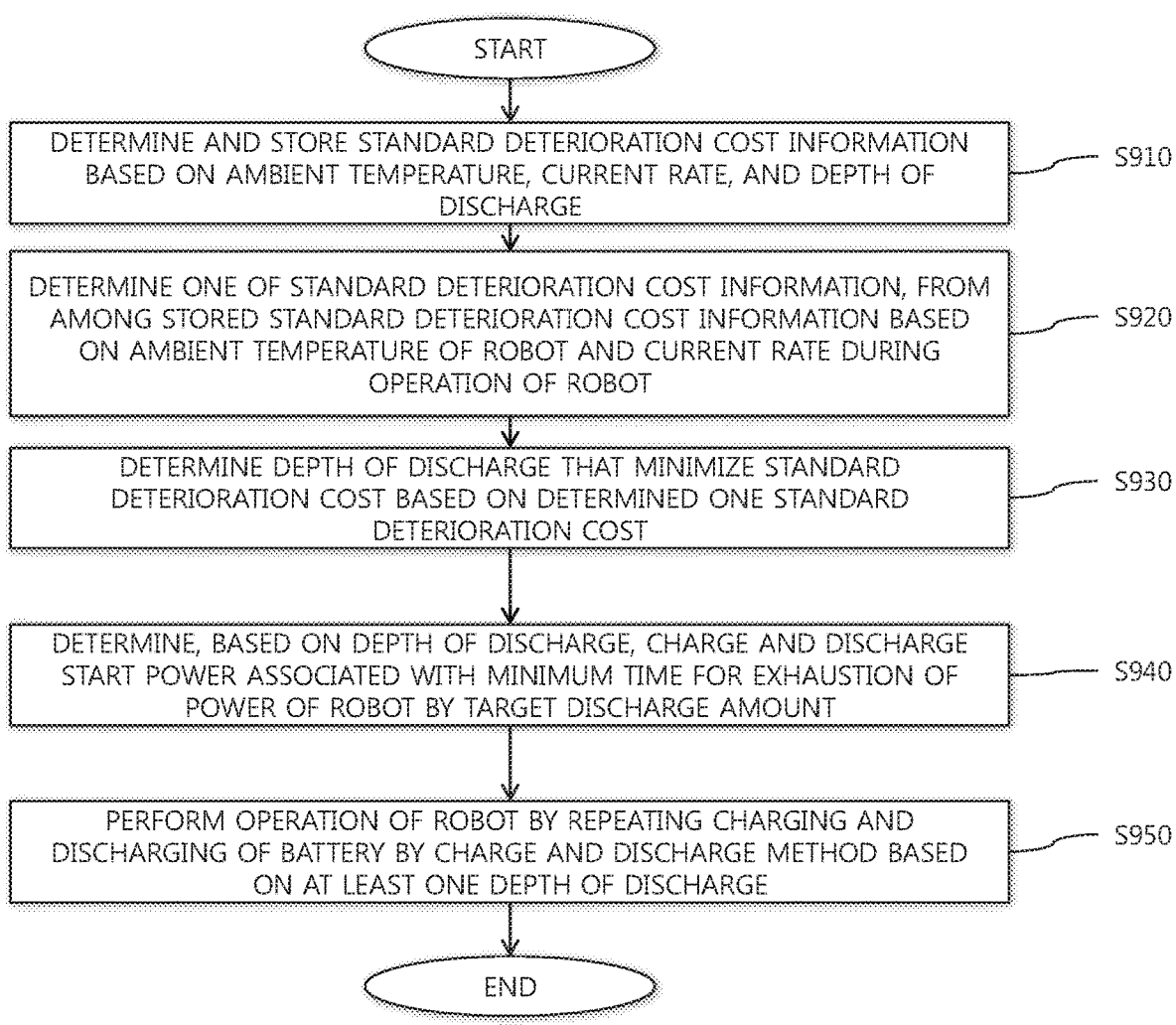
FIG. 9 is a flowchart for explaining determining a depth of discharge that minimizes standard deterioration cost and determining charge and discharge start power that minimizes a time taken to exhaust power by a target discharge amount according to an embodiment.

FIG. 9 is a flowchart illustrating a process of determining a depth of discharge that minimizes standard deterioration cost and determining charge and discharge start power that minimizes a time taken to exhaust a target discharge amount according to an embodiment. Other embodiments and configurations may also be provided. The features of steps S910 to S920 and S950 of FIG. 9 may be the same as or similar to those of steps S410 to S420 and S440 of FIG. 4, and thus a detailed description thereof may be omitted.

According to an embodiment, robot 200 may perform multiple charging and discharging processes to complete an operation, and accordingly, the cumulative amount of discharge when it is determined that the operation is finally completed may have a value determined in consideration of all of the amount of power discharged in multiple discharging processes performed after the start of the operation. According to an embodiment, since the cumulative discharge amount from the time when robot 200 starts to operate until the operation is completed may be the discharge amount required to complete the operation started by robot 200 (i.e., a target discharge amount), exhaustion of power by robot 200 to the target discharge amount may be understood as completion of the operation.

In step S930, robot 200 may determine the depth of discharge that minimizes the standard deterioration cost based on the one standard deterioration cost determined in step S920 and based on the ambient temperature and the current rate during an operation according to an embodiment.

In step S940, robot 200 may determine charge and discharge start power associated with the minimum time required to exhaust power of robot 200 by a target discharge amount based on the depth of discharge determined in step S930 according to an embodiment. That is, since the charge and discharge start power may be different even if the depth of discharge is the same, robot 200 may use a charge and discharge method that minimizes the time required until the operation is completed among the charge and discharge methods that minimizes the rate of aging by determining the depth of discharge and considering the charge and discharge start power. Accordingly, by determining the charge and discharge method in consideration of both the degree of aging of battery 210 and the operational speed, robot 200 may effectively prevent the aging of battery 210 within a range in which the user does not feel uncomfortable in actual use.

According to an embodiment, robot 200 may use a charge and discharge method based on a predetermined charging method in order to shorten the time taken to complete an operation. According to an embodiment, the charge rate associated with the charging method that may be used by robot 200 may vary based on a "charging profile". According to an embodiment, the charging profile may include a constant current charging method in which the amount of power linearly increases and a constant voltage charging method in which the amount of power increases exponentially, and robot 200 may perform charging using at least one of the two methods.

According to an embodiment, robot 200 may determine charge and discharge start power so that battery 210 is charged only by the constant current charging method in order to reduce the rate of aging and minimize the time taken to complete an operation.

Since charging is performed using a constant amount of current in the constant current charging method according to an embodiment, the state of charge of battery 210 increases linearly during charging according to the constant current charging method. According to an embodiment, charging is performed using a constant voltage in the constant voltage charging method, and the state of charge of battery 210 may tend to increase exponentially. According to an embodiment, robot 200 may control charging unit 220 (or charging device) so that battery 210 is charged to the start-of-discharge power based on the constant current charging method. Thereby, robot 200 may perform charging using the constant current charging method within a range from start-of-charge power to start-of-discharge power so that battery 210 is rapidly charged. According to an embodiment, the open-circuit voltage of battery 210 or the state of charge corresponding thereto for implementation of charging using the constant current charging method may be set by the user, and/or may have a preset value.

According to an embodiment, robot 200 may determine at least one depth of discharge by further considering whether or not charging by the constant current charging method is possible. For example, in step S430 of FIG. 4, based on whether or not start-of-discharge power, which may be charged using the constant current charging method, may be set, in addition to being based on the ambient temperature and the current rate during the operation, robot 200 may determine at least one depth of discharge at which standard deterioration cost is equal to or less than a predetermined threshold.

According to an embodiment, when the rate of aging deviates from a predetermined range from the minimum rate of aging, the charge and discharge start power may be determined so that battery 210 is charged by the constant current charging method and the constant voltage charging method.

According to an embodiment, in the constant current charging method, the state of charge of battery 210 increases linearly, whereas the voltage may tend to rapidly increase as the state of charge of battery 210 decreases. According to an embodiment, in the constant voltage charging method, charging is performed using a constant voltage, and the state of charge of battery 210 may tend to increase exponentially. According to an embodiment, robot 200 performs charging of battery 210 by the constant current charging method, and when the voltage of battery 210 has reached a given value, robot may change the charging profile so that the battery is charged by the constant voltage mode. Accordingly, robot 200 may increase the voltage of battery 210 while charging the battery by the constant current charging method in order to constantly supply the charging current to battery 210 having a low state of charge at the start of charging, and thereafter may charge battery 210 by the constant voltage charging method after the voltage is increased to some extent. By using such a charging method, robot 200 may quickly charge battery 210 and may prevent battery 210 from being damaged due to a difference in voltage between battery 210 and power supply unit 223.

Figure 10A:
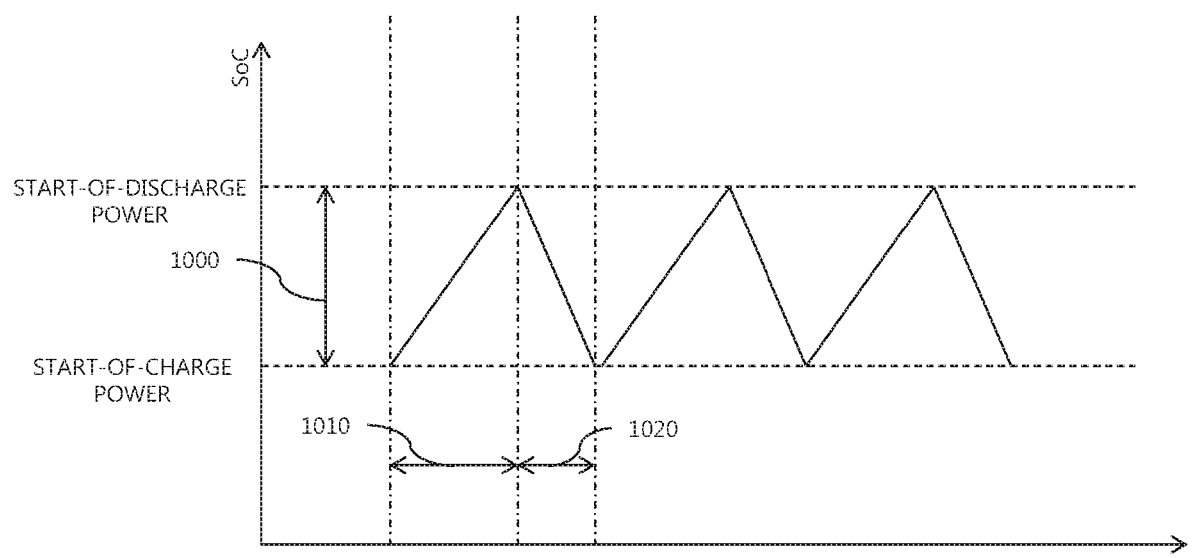
FIGS. 10A and 10B are views for explaining an example in which a robot uses only a constant current charging method or uses both a constant current charging method and a constant voltage charging method when charging a battery according to an embodiment.
Figure 10B:
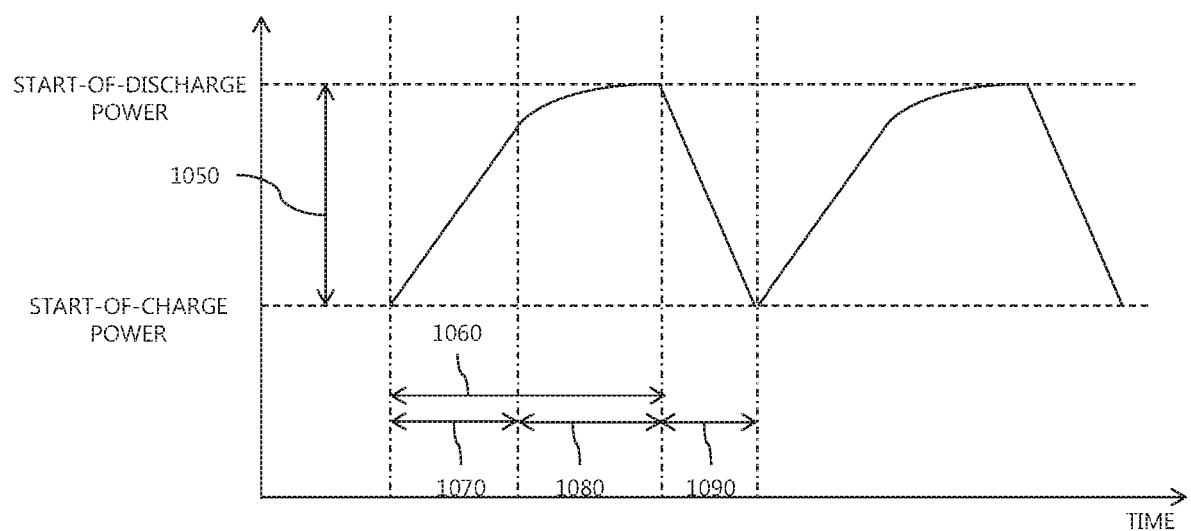

FIGS. 10A and 10B are views for explaining an example in which robot uses only a constant current charging method or uses both a constant current charging method and a constant voltage charging method when charging battery according to an embodiment. Other embodiments and configurations may also be provided.

According to an embodiment, FIG. 10A illustrates a change in the state of charge in battery 210 when battery 210, which has been charged by the constant current charging method, is discharged. Referring to FIG. 10A, it can be seen that the state of charge in battery 210 linearly increases as robot 200 charges battery 210 by the constant current mode during a charge time 1010. Robot 200 stops the charging process by the constant current charging method when the state of charge of battery 210 has reached start-of-discharge power and starts a discharging process. Robot 200 may perform an operation during a discharge time 1020 based on the state of charge of the battery charged during charge time 1010, and the state of charge may linearly decrease during discharge time 1020.

According to an embodiment, FIG. 10B illustrates a change in the state of charge of battery 210 when battery 210, which has been charged by the constant voltage charging method and the constant current charging method, is discharged. Referring to FIG. 10B, a charge time 1060 for battery 210 by robot 200 includes a charge time 1070 by the constant current charging method and a charge time 1080 by the constant voltage charging method. The state of charge of battery 210 does not increase linearly but gradually increases upon charging by the constant voltage charging method, unlike charging by the constant current charging method. Thereby, considering the state of charge (SoC) per hour within charge time 1060, the SoC during charge time 1080 by the constant voltage charging method is lower than that during charge time 1070 by the constant current charging method. When the state of charge of battery 210 has reached start-of-discharge power, robot 200 stops the charging process by the constant voltage charging method and starts to discharge. Robot 200 may perform an operation during a discharge time 1090 based on the state of charge of the battery charged during charge time 1060. According to an embodiment, the state of charge may linearly decrease during discharge time 1090 and the rate of decrease in the state of charge may be the same or substantially the same as in the case of FIG. 10A. The example in which a charge and discharge method for battery 210 may be determined as the constant current charging method and the constant voltage charging method according to the embodiment has been described above and thus, a detailed description thereof may be omitted.

Figure 11:
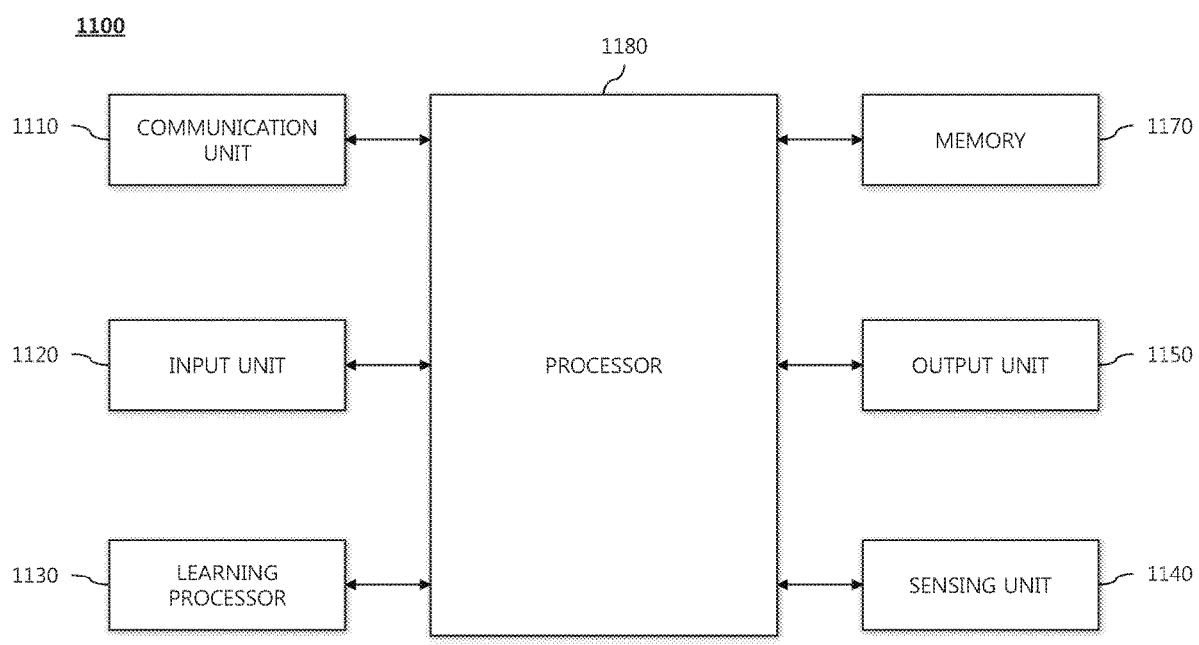
FIG. 11 illustrates an AI device according to an embodiment.

FIG. 11 illustrates an AI device according to an embodiment of the present disclosure. Other embodiments and configurations may also be provided.

AI device 1100 of FIG. 11 may correspond to robot 200 of FIG. 2, and some of constituent elements of FIG. 11, which are not included in robot 200 of FIG. 2, may be selectively adopted within a range in which embodiments of the present disclosure may be realized.

AI device 1100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 11, AI device 1100 may include a communication unit 1110 (or communication device), an input unit 1120 (or input device), a learning processor 1130, a sensing unit 1140 (or sensing device), an output unit 1150 (or output device), a memory 1170, and a processor 1180, for example.

Communication unit 1110 may transmit and receive data to and from external devices, such as other AI devices 1300a to 1300e and an AI server 1200, using wired/wireless communication technologies. For example, communication unit 1110 may transmit and receive sensor information, user input, learning models, and/or control signals, for example, to and from external devices.

The communication technology used by communication unit 1110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 1120 may acquire various types of data.

Input unit 1120 may include a camera for the input of an image signal, a microphone for receiving an audio signal, and a user input unit for receiving information input by a user, for example. The camera or the microphone may be handled as a sensor, and a signal acquired from the camera or the microphone may be referred to as sensing data or sensor information.

Input unit 1120 may acquire, for example, input data to be used when acquiring an output using learning data for model learning and a learning model. Input unit 1120 may acquire unprocessed input data, and processor 1180 or learning processor 1130 may extract an input feature as pre-processing for the input data.

Learning processor 1130 may cause a model configured with an artificial neural network to learn using the learning data. The learned artificial neural network may be called a learning model. The learning model may be used to deduce a result value for newly input data other than the learning data, and the deduced value may be used as a determination base for performing any operation.

Learning processor 1130 may perform AI processing along with a learning processor 1240 of AI server 1200.

Learning processor 1130 may include a memory integrated or embodied in AI device 1100. Alternatively, learning processor 1130 may be realized using memory 1170, an external memory directly coupled to AI device 1100, or a memory held in an external device.

Sensing unit 1140 (or sensing device) may acquire at least one of internal information of AI device 1100, environmental information around AI device 1100, and user information using various sensors.

The sensors included in sensing unit 1140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and/or a temperature sensor, for example.

Output unit 1150 (or output device) may generate, for example, a visual output, an auditory output, and/or a tactile output.

Output unit 1150 may include, for example, a display that outputs visual information, a speaker that outputs auditory information, and/or a haptic module that outputs tactile information.

Memory 1170 may store data which assists various functions of AI device 1100. For example, memory 1170 may store input data acquired by input unit 1120, learning data, learning models, and learning history, for example.

Processor 1180 may determine at least one executable operation of AI device 1100 based on information determined or generated using a data analysis algorithm or a machine learning algorithm. Processor 1180 may control constituent elements of AI device 1100 to perform the determined operation.

Processor 1180 may request, search, receive, or utilize data of learning processor 1130 or memory 1170, and may control the constituent elements of AI device 1100 so as to execute a predictable operation or an operation that is deemed desirable among the at least one executable operation.

When connection of an external device is required to perform the determined operation, processor 1180 may generate a control signal for controlling the external device and may transmit the generated control signal to the external device.

Processor 1180 may acquire (or obtain) intention information with respect to user input and may determine a user request based on the acquired intention information.

Processor 1180 may acquire intention information corresponding to the user input using at least one of a speech to text (STT) engine for converting voice input into a character string and a natural language processing (NLP) engine for acquiring natural language intention information.

At least a part of the STT engine and/or the NLP engine may be configured with an artificial neural network learned according to a machine learning algorithm. The STT engine and/or the NLP engine may have learned by learning processor 1130, may have learned by learning processor 1240 of AI server 1200, or may have learned by distributed processing of these processors.

Processor 1180 may collect history information including, for example, content of an operation of AI device 1100 or feedback of the user with respect to an operation, and may store the collected information in memory 1170 or learning processor 1130, or may transmit the collected information to an external device such as AI server 1200. The collected history information may be used to update a learning model.

Processor 1180 may control at least some of the constituent elements of AI device 1100 in order to drive an application program stored in memory 1170. Processor 1180 may combine and operate two or more of the constituent elements of AI device 1100 for the driving of the application program.

Figure 12:
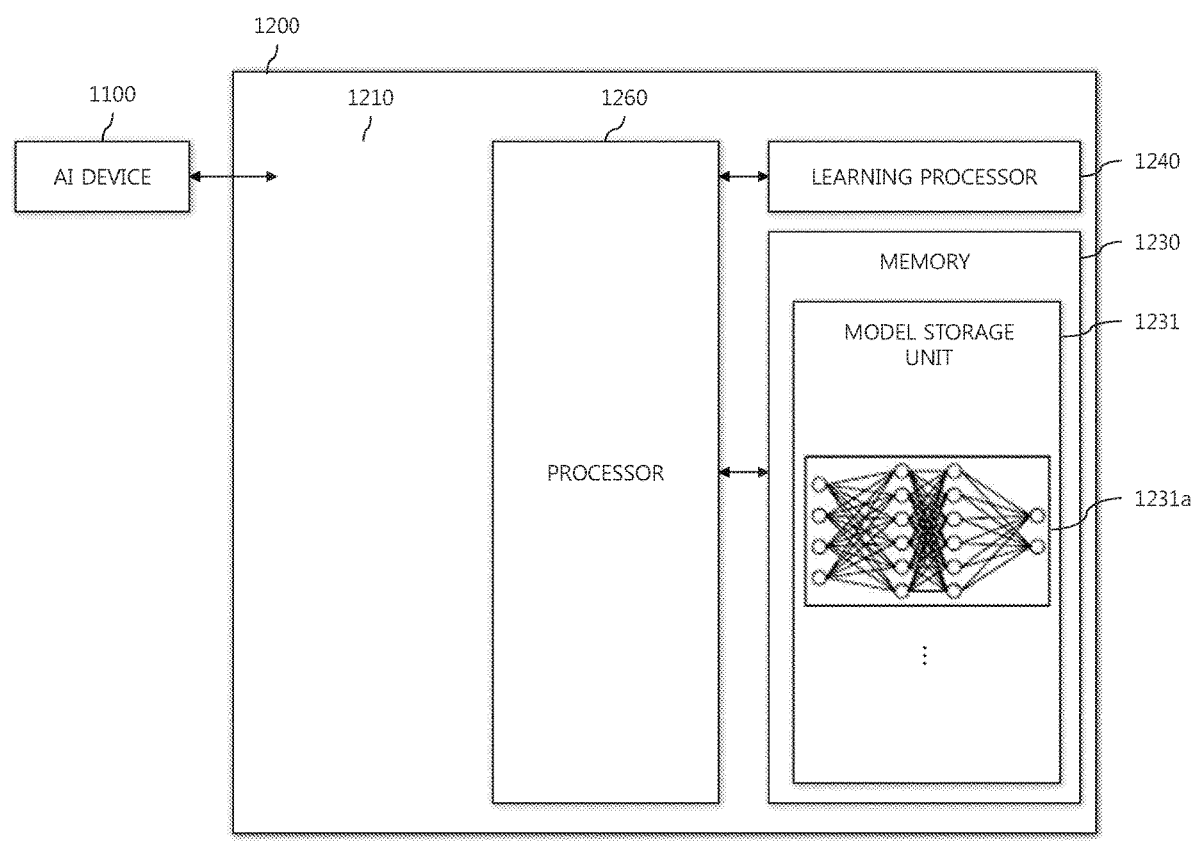
FIG. 12 illustrates an AI server according to an embodiment.

FIG. 12 illustrates AI server 1200 according to an embodiment of the present disclosure. Other embodiments and configurations may also be provided.

Referring to FIG. 12, AI server 1200 may refer to a device that causes an artificial neural network to learn using a machine learning algorithm or uses the learned artificial neural network. AI server 1200 may be constituted of multiple servers to perform distributed processing, and may be defined as a 5G network. AI server 1200 may be included as a constituent element of AI device 1100 so as to perform at least a part of AI processing together with the AI device.

AI server 1200 may include a communication unit 1210 (or communication device), a memory 1230, learning processor 1240, and a processor 260, for example.

Communication unit 1210 may transmit and receive data to and from an external device such as AI device 1100.

Memory 1230 may include a model storage unit 1231 (or model storage device). Model storage unit 1231 may store a model (or an artificial neural network) 1231a which is learning or has learned via learning processor 1240.

Learning processor 1240 may cause artificial neural network 1231a to learn learning data. A learning model may be used in the state of being provided (or mounted) in AI server 1200 of the artificial neural network, or may be used in the state of being provided (or mounted) in an external device such as AI device 1100.

The learning model may be realized in hardware, software, or a combination of hardware and software. When a part or the entirety of the learning model is realized in software, one or more instructions constituting the learning model may be stored in memory 1230.

Processor 1260 may deduce a result value for newly input data using the learning model, and may generate a response or a control instruction based on the deduced result value.

Figure 13:
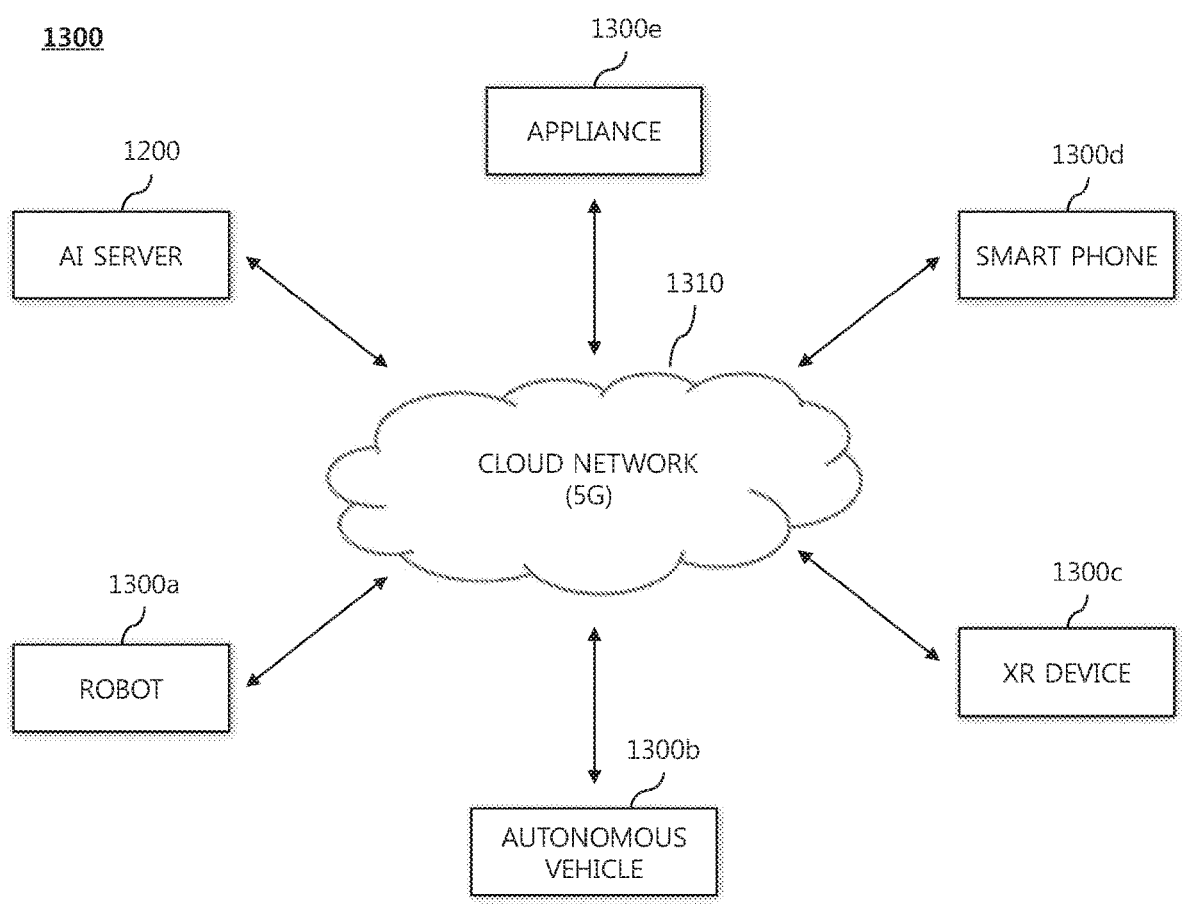
FIG. 13 illustrates an AI system according to an embodiment.

FIG. 13 illustrates an AI system 1300 according to an embodiment of the present disclosure. Other embodiments and configurations may also be provided.

Referring to FIG. 13, in AI system 1300, at least one of AI server 1200, a robot 1300a, an autonomous vehicle 1300b, an XR device 1300c, a smart phone 1300d, and a home appliance 1300e is connected to a cloud network 1310. Here, robot 1300a, autonomous vehicle 1300b, XR device 1300c, smart phone 1300d, and home appliance 1300e, to which AI technologies are applied, may be referred to as AI devices 1300a to 1300e.

Cloud network 1310 may constitute a part of a cloud computing infra-structure, or may refer to a network present in the cloud computing infra-structure. Cloud network 1310 may be configured using a 3G network, a 4G or long term evolution (LTE) network, or a 5G network, for example.

Respective devices 1300a to 1300e and 1200 constituting AI system 1300 may be connected to each other via cloud network 1310. More particularly, respective devices 1300a to 1300e and 1200 may communicate with each other via a base station, and/or may perform direct communication without the base station.

AI server 1200 may include a server which performs AI processing and a server which performs an operation with respect to big data.

AI server 1200 may be connected to at least one of robot 1300a, autonomous vehicle 1300b, XR device 1300c, smart phone 1300d, and home appliance 1300e, which are AI devices constituting AI system 1300, via cloud network 1310, and may assist at least a part of AI processing of connected AI devices 1300a to 1300e.

Rather than AI devices 1300a to 1300e, AI server 1200 may cause an artificial neural network to learn according to a machine learning algorithm, and may directly store a learning model or may transmit the learning model to AI devices 1300a to 1300e.

AI server 1200 may receive input data from AI devices 1300a to 1300e, may deduce a result value for the received input data using the learning model, and may generate a response or a control instruction based on the deduced result value to transmit the response or the control instruction to AI devices 1300a to 1300e.

Alternatively, AI devices 1300a to 1300e may directly deduce a result value with respect to input data using the learning model, and may generate a response or a control instruction based on the deduced result value.

Various embodiments of AI devices 1300a to 1300e, to which the above-described technology is applied, may be described. AI devices 1300a to 1300e shown in FIG. 13 may be specific embodiments of AI device 1100 shown in FIG. 11.

Robot 1300a may be realized into a guide robot, a transportation robot, a cleaning robot, a wearable robot, an entertainment robot, a pet robot, or an unmanned flying robot, for example, through the application of AI technologies.

Robot 1300a may include a robot control module for controlling an operation, and the robot control module may refer to a software module or a chip realized in hardware.

Robot 1300a may acquire (or obtain) information on the state of robot 1300a using sensor information acquired from various types of sensors, may detect (recognize) the surrounding environment and an object, may generate map data, may determine a movement route and a driving plan, may determine a response with respect to user intersection, and/or may determine an operation.

Robot 1300a may use sensor information acquired from at least one sensor among a lidar, a radar, and a camera in order to determine a movement route and a driving plan.

Robot 1300a may perform the above-described operations using a learning model configured with at least one artificial neural network. For example, robot 1300a may recognize the surrounding environment and the object using the learning model, and may determine an operation using the recognized surrounding environment information or object information. The learning model may be directly learned in robot 1300a, and/or may be learned in an external device such as AI server 1200.

Robot 1300a may directly generate a result using the learning model to perform an operation, but may transmit sensor information to an external device such as AI server 1200 and receive a result generated by the external device to perform an operation.

Robot 1300a may determine a movement route and a driving plan using at least one of map data, object information detected from sensor information, and object information acquired from an external device, and a drive unit (or drive device) may be controlled to drive robot 1300a according to the determined movement route and driving plan.

The map data may include object identification information for various objects arranged in a space along which robot 1300a moves. For example, the map data may include object identification information for stationary objects, such as the wall and the door, and movable objects such as a flowerpot and a desk. The object identification information may include names, types, distances, and locations, for example.

Robot 1300a may perform an operation or may drive by controlling the drive unit based on user control or interaction. Robot 1300a may acquire interactional intention information depending on a user operation or voice expression, and may determine a response based on the acquired intention information to perform an operation.

Autonomous vehicle 1300b may be realized into a mobile robot, a vehicle, or an unmanned air vehicle, for example, through application of AI technologies.

Autonomous vehicle 1300b may include an autonomous driving control module for controlling an autonomous driving function, and the autonomous driving control module may mean a software module or a chip realized in hardware. The autonomous driving control module may be a constituent element included in autonomous vehicle 1300b, but may be a separate hardware element outside autonomous vehicle 1300*b* so as to be connected thereto.

Autonomous vehicle 1300*b* may acquire information on the state of autonomous vehicle 1300*b* using sensor information acquired from various types of sensors, may detect (recognize) the surrounding environment and an object, may generate map data, may determine a movement route and a driving plan, or may determine an operation.

Autonomous vehicle 1300*b* may use sensor information acquired from at least one sensor among a lidar, a radar, and a camera in the same manner as robot 1300*a* in order to determine a movement route and a driving plan.

Autonomous vehicle 1300*b* may recognize the environment or an object with respect to an area outside the field of vision or an area located at a predetermined distance or more by receiving sensor information from external devices, or may directly receive recognized information from external devices.

Autonomous vehicle 1300*b* may perform the above-described operations using a learning model configured with at least one artificial neural network. For example, autonomous vehicle 1300*b* may recognize the surrounding environment and the object using the learning model, and may determine a driving line using the recognized surrounding environment information or object information. The learning model may be directly learned in autonomous vehicle 1300*b*, or may be learned in an external device such as AI server 1200.

Autonomous vehicle 1300*b* may generate a result using the learning model to perform an operation, but may transmit sensor information to an external device such as AI server 1200 and receive a result generated by the external device to perform an operation.

Autonomous vehicle 1300*b* may determine a movement route and a driving plan using at least one of map data, object information detected from sensor information, and object information acquired from an external device, and a drive unit (or driving device) may be controlled to drive autonomous vehicle 1300*b* according to the determined movement route and driving plan.

The map data may include object identification information for various objects arranged in a space (e.g., a road) along which autonomous vehicle 1300*b* drives. For example, the map data may include object identification information for stationary objects, such as streetlights, rocks, and buildings, and movable objects such as vehicles and pedestrians. The object identification information may include names, types, distances, and locations, for example.

Autonomous vehicle 1300*b* may perform an operation or may drive by controlling the drive unit based on user control or interaction. Autonomous vehicle 1300*b* may acquire interactional intention information depending on a user operation or voice expression, and may determine a response based on the acquired intention information to perform an operation.

XR device 1300*c* may be realized into a head-mount display (HMD), a head-up display (HUD) provided in a vehicle, a television, a cellular phone, a smart phone, a computer, a wearable device, a home appliance, a digital signage, a vehicle, a stationary robot, and/or a mobile robot, for example, through application of AI technologies.

XR device 1300*c* may obtain information on the surrounding space or a real object by analyzing three-dimensional point cloud data or image data acquired from various sensors or an external device to generate positional data and attribute data for three-dimensional points, and may output an XR object by rendering the XR object to be output. For example, XR device 1300*c* may output an XR object including additional information about a recognized object so as to correspond to the recognized object.

XR device 1300*c* may perform the above-described operations using a learning model configured with at least one artificial neural network. For example, XR device 1300*c* may recognize a real object from three-dimensional point cloud data or image data using a learning model, and may provide information corresponding to the recognized real object. The learning model may be directly learned in XR device 1300*c*, and/or may be learned in an external device such as AI server 1200.

XR device 1300*c* may directly generate a result using the learning model to perform an operation, but may transmit sensor information to an external device such as AI server 1200 and receive the generated result to perform an operation.

Robot 1300*a* may be realized into a guide robot, a transportation robot, a cleaning robot, a wearable robot, an entertainment robot, a pet robot, and/or an unmanned flying robot, for example, through application of AI technologies and autonomous driving technologies.

Robot 1300*a* to which the AI technologies and the autonomous driving technologies are applied may refer to, for example, a robot having an autonomous driving function, and/or may refer to robot 1300*a* which interacts with autonomous vehicle 1300*b*.

Robot 1300*a* having an autonomous driving function may collectively refer to devices that move by themselves along a given moving line without user control, and/or move by determining a moving line by themselves.

Robot 1300*a* and autonomous vehicle 1300*b*, which have an autonomous driving function, may use a common sensing method in order to determine at least one of a movement route or a driving plan. For example, robot 1300*a* and autonomous vehicle 1300*b*, which have an autonomous driving function, may determine at least one of the movement route or the driving plan using information sensed by a lidar, a radar, and a camera.

Robot 1300*a*, which interacts with autonomous vehicle 1300*b*, may be provided separately from autonomous vehicle 1300*b* so as to be connected to the autonomous driving function of autonomous vehicle 1300*b* inside or outside autonomous vehicle 1300*b*, and/or may perform an operation associated with a user who has got on autonomous vehicle 1300*b*.

Robot 1300*a*, which interacts with autonomous vehicle 1300*b*, may acquire sensor information instead of autonomous vehicle 1300*b* to provide the information to autonomous vehicle 1300*b*, and/or may acquire sensor information and generate surrounding environment information or object information to provide the information to autonomous vehicle 1300*b*, thereby controlling or assisting the autonomous driving function of autonomous vehicle 1300*b*.

Alternatively, robot 1300*a*, which interacts with autonomous vehicle 1300*b*, may monitor the user who has got on autonomous vehicle 1300*b* or may control functions of autonomous vehicle 1300*b* via interaction with the user. For example, when it is determined that a driver is in a drowsy state, robot 1300*a* may activate the autonomous driving function of autonomous vehicle 1300*b* and/or may assist the control of a drive unit of autonomous vehicle 1300*b*. The functions of autonomous vehicle 1300*b* controlled by robot 1300*a* may include not only the autonomous driving function, but also a function provided in a navigation system or an audio system provided in autonomous vehicle 1300*b*.

Alternatively, robot 1300*a*, which interacts with autonomous vehicle 1300*b*, may provide information to autonomous vehicle 1300*b* and/or assist the function thereof at the outside of autonomous vehicle 1300*b*. For example, robot 1300*a* may serve as a smart traffic light that provides traffic information including, for example, traffic signal information to autonomous vehicle 1300*b*, and/or may serve as an automatic electric charger of an electric vehicle that may interact with autonomous vehicle 1300*b* and may be automatically connected to a charge port of the vehicle.

Robot 1300*a* may be realized into a guide robot, a transportation robot, a cleaning robot, a wearable robot, an entertainment robot, a pet robot, an unmanned flying robot, or a drone, for example, through application of AI technologies and XR technologies.

Robot 1300*a*, to which the XR technologies are applied, may refer to a robot which is a control or interaction target in an XR image. Robot 1300*a* may be provided separately from XR device 1300*c* and may operate in cooperation with XR device 1300*c*.

When robot 1300*a*, which is a control or interaction target in an XR image, acquires sensor information from sensors including a camera, robot 1300*a* or XR device 1300*c* may generate an XR image based on the sensor information, and XR device 1300*c* may output the generated XR image. Such robot 1300*a* may operate based on a control signal input through XR device 1300*c* or via intersection with the user.

For example, the user may check the XR image corresponding to the viewpoint of robot 1300*a*, which is remotely linked, via an external device such as XR device 1300*c*, and may adjust an autonomous driving route of robot 1300*a* and/or control an operation or driving thereof via interaction with the robot, and/or may check information on an object around thereof.

Autonomous vehicle 1300*b* may be realized into a mobile robot, a vehicle, or an unmanned air vehicle, for example, through application of the AI technologies and the XR technologies.

Autonomous vehicle 1300*b*, to which the XR technologies are applied, may refer to an autonomous vehicle having an XR image providing device, or may refer to an autonomous vehicle as a control or interaction target in an XR image, for example. More particularly, autonomous vehicle 1300*b* as a control or interaction target in an XR image may be provided separately from XR device 1300*c* and may operate in cooperation with XR device 1300*c*.

Autonomous vehicle 1300*b* having the XR image providing device may acquire sensor information from sensors including a camera, and may output an XR image generated based on the acquired sensor information. For example, autonomous vehicle 1300*b* may include an HUD to output an XR image, thereby providing an occupant with an XR object corresponding to a real object or an object in the screen.

At this time, when the XR object is output to the HUD, at least a portion of the XR object may be output so as to overlap with a real object to which the passenger's gaze is directed. On the other hand, when the XR object is output to a display provided in autonomous vehicle 1300*b*, at least a portion of the XR object may be output so as to overlap with an object in the screen. For example, autonomous vehicle 1300*b* may output XR objects corresponding to objects such as a lane, another vehicle, a traffic light, a traffic sign, a two-wheeled vehicle, a pedestrian, and a building.

When autonomous vehicle 1300*b* as a control or interaction target in an XR image acquires sensor information from sensors including a camera, autonomous vehicle 1300*b* or XR device 1300*c* may generate an XR image based on the sensor information, and XR device 1300*c* may output the generated XR image. Autonomous vehicle 1300*b* may operate based on a control signal input through an external device such as XR device 1300*c* or via interaction with the user.

The above-described battery charging method according to the present disclosure may be provided as a program to be executed in a computer and be recorded on a computer readable recording medium.

The battery charging method of the present disclosure may be executed via software. When executed via software, constituent elements of the present disclosure are code segments that execute required operations. The program or the code segments may be stored in a processor readable medium.

The computer readable recording medium includes all kinds of recording devices in which data is stored in a computer readable manner. Examples of the computer readable recording device include a ROM, a RAM, a CD-ROM, a DVD-ROM, a DVD-RAM, a magnetic tape, a floppy disc, a hard disc, and an optical data storage device. Additionally, the computer readable recording device may be distributed in a computer device connected thereto via a network so that a computer readable code may be stored and executed in a distribution manner.

The present disclosure is devised to increase a lifespan of a secondary battery included in a robot by minimizing the rate of aging of the battery due to a charging and discharging process in order to reduce the user's burden on the replacement cost of the battery.

The present disclosure is devised to reduce the rate of aging of a battery and increase the lifespan thereof using the depth of discharge (DoD) of the battery, other than the state of charge (SoC), in order to estimate the degree of aging of the battery in an operating environment in which a robot needs to perform an operation while repeating a charging and discharging process constantly.

The present disclosure is devised to enable a robot to efficiently perform a charging process only for a time effective for prevention of aging of a battery while the robot is not operating in order not to substantially disturb an operation of the robot.

The present disclosure is devised to determine, through the use of artificial intelligence, the amount of power in a battery at which a robot stops a charging process and the amount of power in the battery at which the robot restarts the charging operation in consideration of an environment in which the robot substantially performs an operation, and accordingly provide the most efficient battery charge and discharge method for the operating environment of the robot.

In order to solve the above-described technical solutions, according to one embodiment, there is provided a method of charging a battery included in a robot that performs charging and discharging constantly during an operation, the method including predetermining and storing standard deterioration cost information based on an ambient temperature, a current rate, and a depth of discharge (DoD), determining one standard deterioration cost information among the stored standard deterioration cost information based on an ambient temperature of the robot and a current rate during an operation of the robot, determining at least one depth of discharge at which the standard deterioration cost is equal to or less than a predetermined threshold based on the determined one standard deterioration cost information, and performing the operation by repeating a process of charging and discharging the battery by a charge and discharge method based on the at least one depth of discharge.

In order to solve the above-described technical solutions, according to another embodiment, there is provided a robot that performs charging and discharging constantly during an operation, the robot including a rechargeable battery, a charging unit configured to charge the battery, a processor configured to control the robot so as to predetermine standard deterioration cost information based on an ambient temperature, a current rate, and a depth of discharge, to determine one standard deterioration cost information among the stored standard deterioration cost information based on an ambient temperature of the robot and a current rate during an operation of the robot, to determine at least one depth of discharge at which the standard deterioration cost is equal to or less than a predetermined threshold based on the determined one standard deterioration cost information, and to perform the operation by controlling the charging unit to repeat a process of charging and discharging the battery by a charge and discharge method based on the at least one depth of discharge, and a memory configured to store the predetermined information on the standard degradation cost.

In order to solve the above-described technical solutions, according to a further embodiment, there is provided a non-transitory computer readable recording medium including a computer program for performing a battery charging method.

According to an embodiment of the present disclosure, it is possible to prevent the situation in which a battery is charged beyond a required amount of power for an operation in an operating environment in which the battery is repeatedly charged and discharged, thereby preventing unnecessary power consumption.

According to an embodiment of the present disclosure, it is possible to determine optimal charge and discharge start power, which may delay the rate of aging of a battery per a workload even if a robot is driven at the same depth of discharge, and determine the time when the battery has reached the determined optimal charge and discharge start power.

According to an embodiment of the present disclosure, it is possible to input predetermined information, which may be obtained during repeated charging and discharging processes, to an artificial neural network, which has machine-learned, to output charge and discharge start power optimized for an operating environment or the state of a battery, for example, and start a charging and discharging process based on the output information. Thereafter, by causing the artificial neural network to again perform machine learning according to the result of charge and discharge of the battery, it is possible to determine charge and discharge start power optimized for each of various operating environments that a robot may encounter. Therefore, it is possible to perform a process of determining start-of-discharge power and start-of-charge power, which are adaptive to an operating environment.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of charging a battery of a robot that performs charging and discharging during an operation, the method comprising:
   determining a plurality of standard deterioration cost information based on an ambient temperature, a current rate, and a depth of discharge (DoD);
   storing the plurality of standard deterioration cost information;
   determining one of the standard deterioration cost information, from among the stored standard deterioration cost information, based on an ambient temperature of the robot and a current rate during an operation of the robot;
   determining, based on the determined one of the standard deterioration cost information, at least one depth of discharge in which standard deterioration cost is equal to or less than a predetermined threshold; and
   performing the operation of the robot by repeating charging and discharging of the battery by a charge and discharge method based on the at least one determined depth of discharge.

2. The method of claim 1, wherein the performing of the operation includes:
   determining at least one charge and discharge start power that includes start-of-discharge power and start-of-charge power associated with each of the at least one depth of discharge;
   determining charge and discharge start power having aging information that indicates a lowest degree to which the battery is to be degraded for each discharge amount from among the at least one charge and discharge start power; and
   performing, based on the determined charge and discharge start power, the operation of the robot while repeating the charging and discharging of the battery by the charge and discharge method.

3. The method of claim 2, further comprising:
   providing, as input information to an artificial neural network, the ambient temperature, the current rate, and the determined charge and discharge start power;
   obtaining charge and discharge start power as output information from the artificial neural network, and
   changing the stored standard deterioration cost information by using the obtained charge and discharge start power,
   wherein the artificial neural network is to perform machine learning using input information that includes the charge and discharge start power as the output information.

4. The method of claim 1, wherein the determining of the standard deterioration cost information includes determining non-predetermined standard deterioration cost information via interpolation or extrapolation based on the determined standard deterioration cost information when at least one of the ambient temperature, the current rate, and the depth of discharge does not correspond to the determined standard deterioration cost information.

5. The method of claim 1, wherein the determining of the at least one depth of discharge includes determining a depth of discharge that minimizes standard deterioration cost based on the ambient temperature of the robot and the current rate during the operation of the robot, and
   wherein the performing of the operation includes:
   determining, based on the depth of discharge, charge and discharge start power associated with a minimum time for exhaustion of power of the robot by a target discharge amount; and
   performing, based on the charge and discharge start power associated with the minimum time, the operation while repeating the charging and discharging of the battery by the charge and discharge method.

6. The method of claim 1, wherein the determining of the at least one depth of discharge includes determining the at least one depth of discharge in which a charging of the battery is performed within a range in which the battery is charged by a constant current charging method.

7. A robot that performs charging and discharging during an operation, the robot comprising:
   a rechargeable battery;
   a charging device configured to charge the battery;
   a processor configured to:
   determine a plurality of standard deterioration cost information based on an ambient temperature, a current rate, and a depth of discharge,
   store the determined plurality of standard deterioration cost information,
   determine one of the standard deterioration cost information from among the stored standard deterioration cost information based on an ambient temperature of the robot and a current rate during an operation of the robot,
   determine, based on the determined one standard deterioration cost information, at least one depth of discharge in which standard deterioration cost is equal to or less than a predetermined threshold, and
   control the robot so as to perform the operation by controlling the charging device to repeat charging and discharging of the battery by a charge and discharge method based on the at least one determined depth of discharge; and
   a memory configured to store the determined standard deterioration cost information.

8. The robot of claim 7, wherein the processor is configured to:
   determine at least one charge and discharge start power that includes start-of-discharge power and start-of-charge power associated with each of the at least one depth of discharge,
   determine charge and discharge start power having aging information that indicates a lowest degree to which the battery to be degraded for each discharge amount from among the at least one charge and discharge start power, and
   perform the operation while repeating the charging and discharging of the battery by a charge and discharge method based on the determined charge and discharge start power.

9. The robot of claim 8, wherein the processor is configured to:
   provide, as input information to an artificial neural network, the ambient temperature, the current rate, and the determined charge and discharge start power, obtain charge and discharge start power as output information from the artificial neural network, and control the memory so as to change the stored standard deterioration cost information by using the obtained charge and discharge start power, and wherein the artificial neural network is to perform machine learning using input information that includes the charge and discharge start power as the output information.

10. The robot of claim 7, wherein the processor is configured to:

determine non-predetermined standard deterioration cost information via interpolation or extrapolation based on the determined standard deterioration cost information when at least one of the ambient temperature, the current rate, and the depth of discharge does not correspond to the determined standard deterioration cost information, and control the memory so as to store the non-determined standard deterioration cost information.

11. The robot of claim 7, wherein the processor is configured to:

determine a depth of discharge that minimizes standard deterioration cost based on the ambient temperature of the robot and the current rate during the operation of the robot, determine, based on the depth of discharge, charge and discharge start power associated with a minimum time for exhaustion of power of the robot by a target discharge amount, and perform the operation while repeating the charging and discharging of the battery based on the charge and discharge start power associated with the minimum time.

12. The robot of claim 7, wherein the processor is configured to determine the at least one depth of discharge in which a charging of the battery is performed within a range in which the battery is charged by a constant current charging method.

13. A method of charging a battery of a robot during an operation, the method comprising:

determining one of a plurality of stored standard deterioration cost information based on an ambient temperature of the robot and a current rate during an operation of the robot;

determining, based on the determined one of the standard deterioration cost information, at least one depth of discharge having standard deterioration cost be equal to or less than a predetermined threshold; and performing the operation of the robot while repeating charging and discharging of the battery using the at least one determined depth of discharge.

14. The method of claim 13, wherein the performing of the operation includes:

determining at least one charge and discharge start power that includes start-of-discharge power and start-of-charge power associated with each of the at least one depth of discharge;

determining charge and discharge start power having aging information that indicates a lowest degree to which the battery is to be degraded for each discharge amount from among the at least one charge and discharge start power; and performing the operation of the robot while repeating the charging and discharging of the battery based on the determined charge and discharge start power.

15. The method of claim 14, further comprising:

providing, as input information to an artificial neural network, the ambient temperature, the current rate, and the determined charge and discharge start power;

obtaining charge and discharge start power as output information from the artificial neural network, and changing the stored standard deterioration cost information by using the obtained charge and discharge start power, wherein the artificial neural network is to perform machine learning using input information that includes the charge and discharge start power as the output information.

16. The method of claim 13, comprising determining the plurality of standard deterioration cost information based on an ambient temperature, a current rate, and a depth of discharge.

17. The method of claim 16, wherein the determining of the plurality of standard deterioration cost information includes determining non-predetermined standard deterioration cost information via interpolation or extrapolation based on the determined standard deterioration cost information when at least one of the ambient temperature, the current rate, and the depth of discharge does not correspond to the determined standard deterioration cost information.

18. The method of claim 13, wherein the determining of the at least one depth of discharge includes determining a depth of discharge that minimizes standard deterioration cost based on the ambient temperature of the robot and the current rate during the operation of the robot, and wherein the performing of the operation includes:

determining, based on the depth of discharge, charge and discharge start power associated with a minimum time for exhaustion of power of the robot by a target discharge amount; and performing, based on the charge and discharge start power associated with the minimum time, the operation while repeating the charging and discharging of the battery by the charge and discharge method.

* * * * *